(12) United States Patent
Kato et al.

(10) Patent No.: US 8,385,649 B2
(45) Date of Patent: Feb. 26, 2013

(54) INFORMATION PROCESSING APPARATUS AND METHOD FOR DETECTING OBJECT IN IMAGE DATA

(75) Inventors: Masami Kato, Sagamihara (JP); Yoshinori Ito, Tokyo (JP); Osamu Nomura, Tokyo (JP); Takahisa Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 12/765,190

(22) Filed: Apr. 22, 2010

(65) Prior Publication Data

US 2010/0272351 A1  Oct. 28, 2010

(30) Foreign Application Priority Data

Apr. 23, 2009 (JP) ................................. 2009-105486

(51) Int. Cl.
*G06K 9/62* (2006.01)
(52) U.S. Cl. ........................................ 382/173; 382/159
(58) Field of Classification Search .................... None
See application file for complete search history.

(56) References Cited

U.S. PATENT DOCUMENTS

2005/0102246 A1*  5/2005  Movellan et al. ............... 706/12

FOREIGN PATENT DOCUMENTS

JP           2005-284348           10/2005

OTHER PUBLICATIONS

Viola, P.; Jones, M., "Rapid object detection using a boosted cascade of simple features", Proc. of Computer Vision and Pattern Recognition, Dec. 2001, IEEE Computer Society, pp. 511-518.

* cited by examiner

*Primary Examiner* — Atiba O Fitzpatrick
*Assistant Examiner* — Thomas A James
(74) *Attorney, Agent, or Firm* — Carter, DeLuca, Farrell & Schmidt LLP

(57) ABSTRACT

Learning is sequentially executed with respect to weak discriminators based on learning data held in a storage device. Upon learning, an evaluation value for the weak discriminator is calculated. It is discriminated, based on a shift of the evaluation value, whether or not the learning is overlearning. If it is discriminated that the learning is overlearning, new learning data is added. Thus, the overlearning is easily detected and the learning is efficiently executed.

9 Claims, 19 Drawing Sheets

INFORMATION PROCESSING APPARATUS AND METHOD FOR DETECTING OBJECT IN IMAGE DATA

BACKGROUND OF THE INVENTION

1. Field of the Invention

The present invention relates to information processing apparatus and method for detecting an object in image data.

2. Description of the Related Art

In recent years, various kinds of methods of detecting and identifying a specific object in image data have been proposed and put into practical use.

Among them, a method disclosed in Viola, P.; Jones, M., "Rapid object detection using a boosted cascade of simple features", Proc. of Computer Vision and Pattern Recognition, 2001-12, IEEE Computer Society, pages 511-518, is highlighted because of its high processing speed. The method of the above thesis is a method whereby strong discriminators each constructed by a plurality of weak discriminators which are formed by a boosting learning algorithm are cascade-connected and processes are progressed while making a truncation discrimination (forced termination of processes to a detection target position) every strong discriminator. FIG. 1 is a diagram illustrating a constructional concept of the system disclosed in the above thesis. Discriminators $3_1$ to $3_m$ (True: There is detection target object, False: Detection target object does not exist) which are formed by learning are constructed by a plurality of simple discriminating filters of a small processing load. Each discriminating filter is called a weak discriminator because its discriminating ability is not so high. The discriminators ($3_1$ to $3_m$) in which results of a plurality of weak discriminators are integrated based on reliability values, which will be described hereinafter, are called strong discriminators. For simplicity of description, the strong discriminator constructed by a plurality of weak discriminators formed by the boosting learning algorithm is called a boosting discriminator. FIG. 2 is a diagram illustrating an internal construction of each of the boosting discriminators $3_1$ to $3_m$. Weak discriminators $41_1$ to $41_n$ and a threshold value processor 420 for integrating discrimination results of the weak discriminators and discriminating are illustrated.

In the above thesis, each of the weak discriminators $41_1$ to $41_n$ is constructed by an extremely simple discriminating filter called a rectangle filter. FIG. 3 is a diagram illustrating an example of the rectangle filter. Image blocks 51a to 51c serving as detection targets are partial area images of a predetermined size (size including an object as a detection target) cut out of the whole image. In FIG. 4, a whole image data 61 as a detection target and a partial area image 62 corresponding to 51a to 51c are illustrated. The partial area image is referred to as a detection window hereinbelow. The weak discriminator scans the detection window by a predetermined step size and identifies on a detection window unit basis, thereby deciding the presence or absence of the specific object in the image and its position. Examples of rectangle filters 52a to 52c are illustrated. The weak discriminator discriminates the existence of the object by setting a difference between pixel value sums of the areas shown by a white area and a black area to a feature of a local area in the detection window.

As illustrated in FIGS. 2 and 3, the boosting discriminator uses a number of weak discriminators having different characteristics, thereby finally realizing an identifying function (strong discrimination) of high discriminating performance.

A method of efficiently learning such a boosting discriminator has been proposed in Japanese Patent Application Laid-Open No. 2005-284348.

SUMMARY OF THE INVENTION

Since the boosting discriminator needs to form hundreds to thousands of weak discriminators by learning, it takes a very long time for the learning.

Japanese Patent Application Laid-Open No. 2005-284348 proposes a method whereby learning data which satisfies predetermined conditions is sequentially deleted from a learning data set according to a discrimination reference value (accumulated score value, which will be described hereinafter) based on outputs of the discriminators which have already been learned. According to such a method, in order to prevent overlearning (deterioration in generalizing performance), it is necessary to preliminarily prepare a sufficiently large number of learning data and, further, to evaluate the performance by using a large amount of inspection data every learning of the weak discriminator. According to such a method, if it is determined as an evaluation result that the system is in the overlearning state, it is necessary to manually add or exchange the learning data.

The invention is made in consideration of such a problem and it is an object of the invention to easily detect overlearning and to efficiently perform the learning.

According to the invention, therefore, there is provided an information processing apparatus that comprises a learning unit configured to sequentially execute learning with respect to weak discriminators based on learning data held in a storage device and a discriminating unit configured to discriminate whether or not the learning is overlearning based on reliability to the weak discriminator which is calculated at the time of the learning, and that adds new learning data and continues the learning about the weak discriminator, if it is determined by the discriminating unit that the learning is overlearning.

According to the invention, therefore, there is provided an information processing apparatus that comprises a learning unit configured to sequentially execute learning with respect to weak discriminators based on learning data held in a storage device and a discriminating unit configured to discriminate whether or not the learning is overlearning based on a weighted error rate to the weak discriminator which is calculated at the time of the learning, and that adds new learning data and continues the learning about the weak discriminator, if it is determined by the discriminating unit that the learning is overlearning.

According to the invention, therefore, there is provided an information processing apparatus that comprises a learning unit configured to sequentially execute learning with respect to weak discriminators based on learning data held in a storage device and a discriminating unit configured to discriminate whether or not the learning is overlearning based on an average accumulated score serving as an average of the accumulated score regarding discrimination results of discriminating filters constructing the weak discriminator which is calculated at the time of the learning, and that adds new learning data and continues the learning about the weak discriminator, if it is determined by the discriminating unit that the learning is overlearning.

According to the invention, therefore, there is provided an information processing apparatus that comprises a learning unit configured to sequentially execute learning with respect to weak discriminators based on learning data held in a storage device and a discriminating unit configured to discriminate whether or not the learning is overlearning based on the accumulated score regarding discrimination results of discriminating filters constructing the weak discriminator which is calculated at the time of the learning and a truncation threshold of the weak discriminator, and that adds new learning data and continues the learning about the weak discriminator, if it is determined by the discriminating unit that the learning is overlearning.

Further features and aspects of the present invention will become apparent from the following detailed description of exemplary embodiments with reference to the attached drawings.

DESCRIPTION OF THE EMBODIMENTS

An embodiment of the invention will be described hereinbelow with reference to the drawings.

Figure 5:
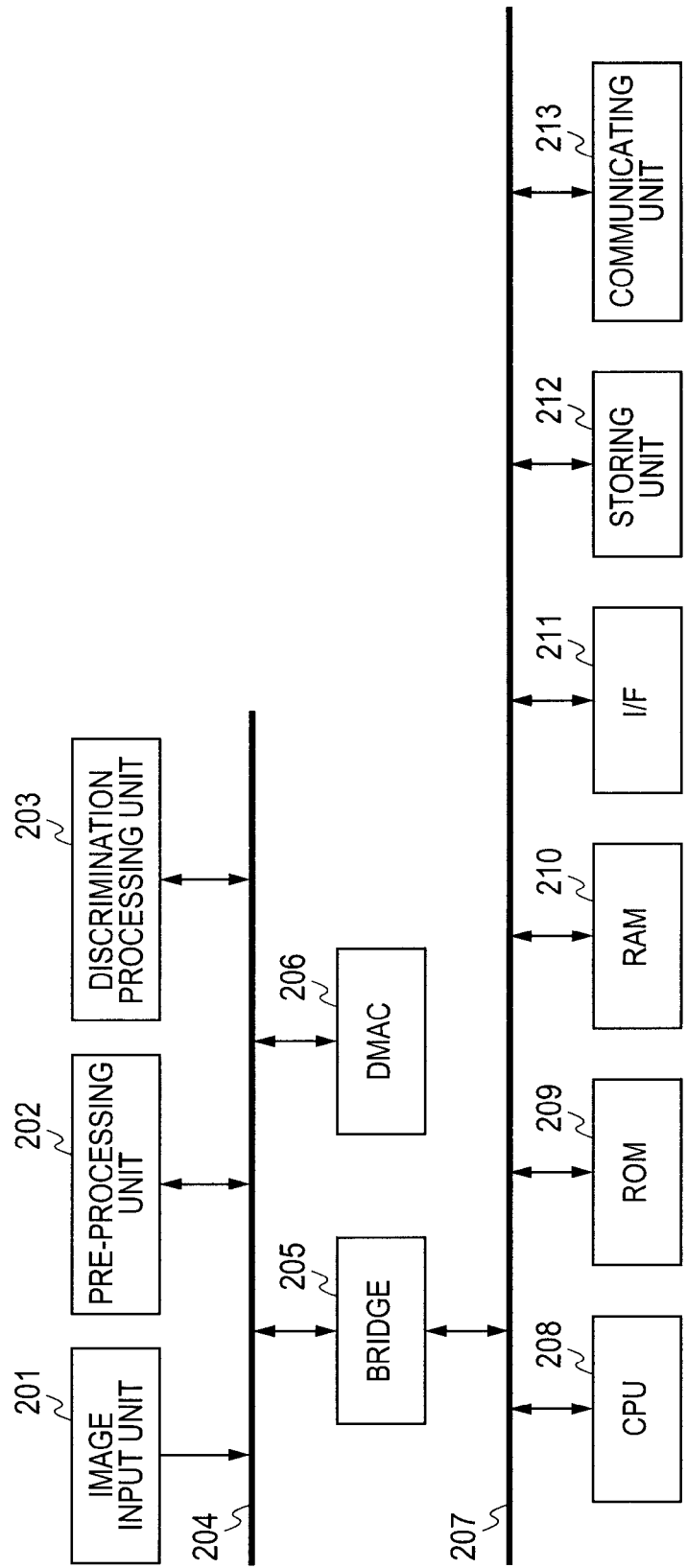
FIG. 5 is a diagram illustrating an example of a construction of an information processing apparatus.

FIG. 5 is a diagram illustrating an example of a construction of an information processing apparatus. The information processing apparatus has a function for detecting a specific object (image pattern) in image data and, further, a function for learning a discriminator for detection in the information processing apparatus.

In FIG. 5, an image input unit 201 is constructed by: a photoelectric converting device such as optical sensor, CCD (Charge-Coupled Devices) sensor, or CMOS (Complimentary Metal Oxide Semiconductor) sensor; a driver circuit for controlling the sensor; an A/D converter; a signal processing circuit for making various kinds of correction; a frame buffer; and the like.

A pre-processing unit 202 executes various kinds of pre-processes for effectively executing the detecting process. More specifically describing, the pre-processing unit 202 executes various kinds of image data conversion such as color converting process, contrast correcting process, and formation of SAT (Summed Area Table) data by hardware. A discrimination processing unit 203 has a function for discriminating a predetermined object by referring to an output of the pre-processing unit 202. The discrimination processing unit 203 executes a boosting discriminating process based on parameters formed by learning. A DMAC (Direct Memory Access Controller) 206 is provided. The DMAC 206 executes a data transfer among the processing units connected onto an image bus 204, a data transfer between each device connected onto the image bus 204 and a RAM 210/a ROM 209 connected onto a CPU (Central Processing Unit) bus 207, and the like.

A bridge 205 provides a bus bridge function between the image bus 204 and the CPU bus 207. A CPU 208 executes processes according to the embodiment and controls the operation of the whole information processing apparatus. Commands (program) which specify the operation of the CPU 208 have been stored in the ROM 209. The RAM 210 is a work memory necessary for the operation of the CPU 208. The RAM 210 is constructed by a memory having a relatively large capacity such as a DRAM (Dynamic RAM). The CPU 208 can access the various kinds of processing units on the image bus 204 through the bridge 205. By separating the image bus 204 and the CPU bus 207, the CPU 208 and the processing units 201 to 203 constructed by the hardware can operate simultaneously. An interface unit 211 is, for example, an input/output interface for the operator to designate the operation of the information processing apparatus. A storing unit 212 is a data storage device of a large storage capacity such as hard disk or flash memory. A data set for learning is stored in the storing unit 212. A communicating unit 213 can transfer a data group for learning from an external apparatus to the storing unit 212 through the processing unit.

First, the detecting process of the object in the embodiment will be described.

Figure 6:
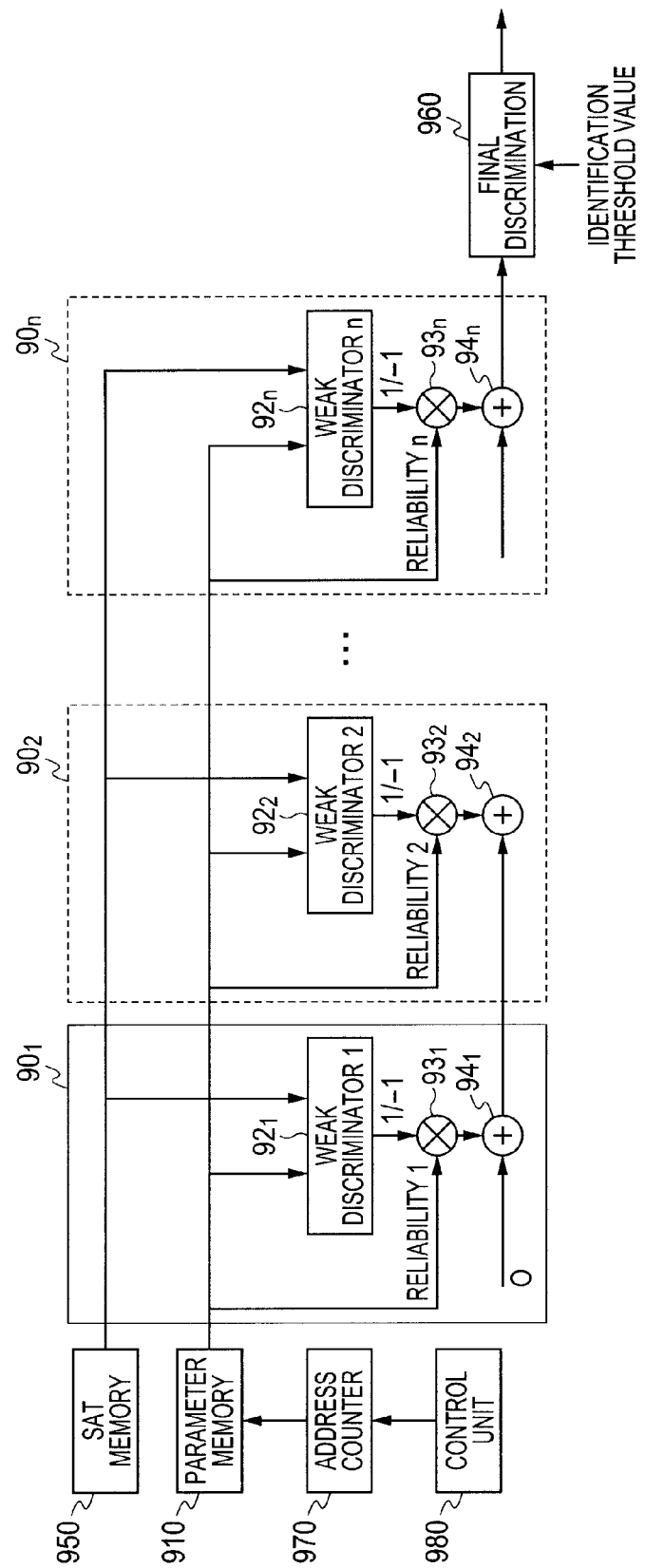
FIG. 6 is a diagram for describing details of a discrimination processing unit.

FIG. 6 is a diagram for describing details of the discrimination processing unit 203. Each of blocks $90_1$ to $90_n$ (n: the number of weak discriminators) indicates one weak discriminator and its peripheral circuits and is physically constructed by one circuit. That is, the blocks $90_1$ to $90_n$ indicate logical processing constructions. Actually, one processing block $90_1$ time-divisionally processes the contents of each weak discriminator ($90_1$ to $90_n$) on a unit basis of a weak discriminator arithmetic operation. Naturally, all or some of the blocks $90_1$ to $90_n$ may be constructed as circuits which are physically independent.

Figure 7:
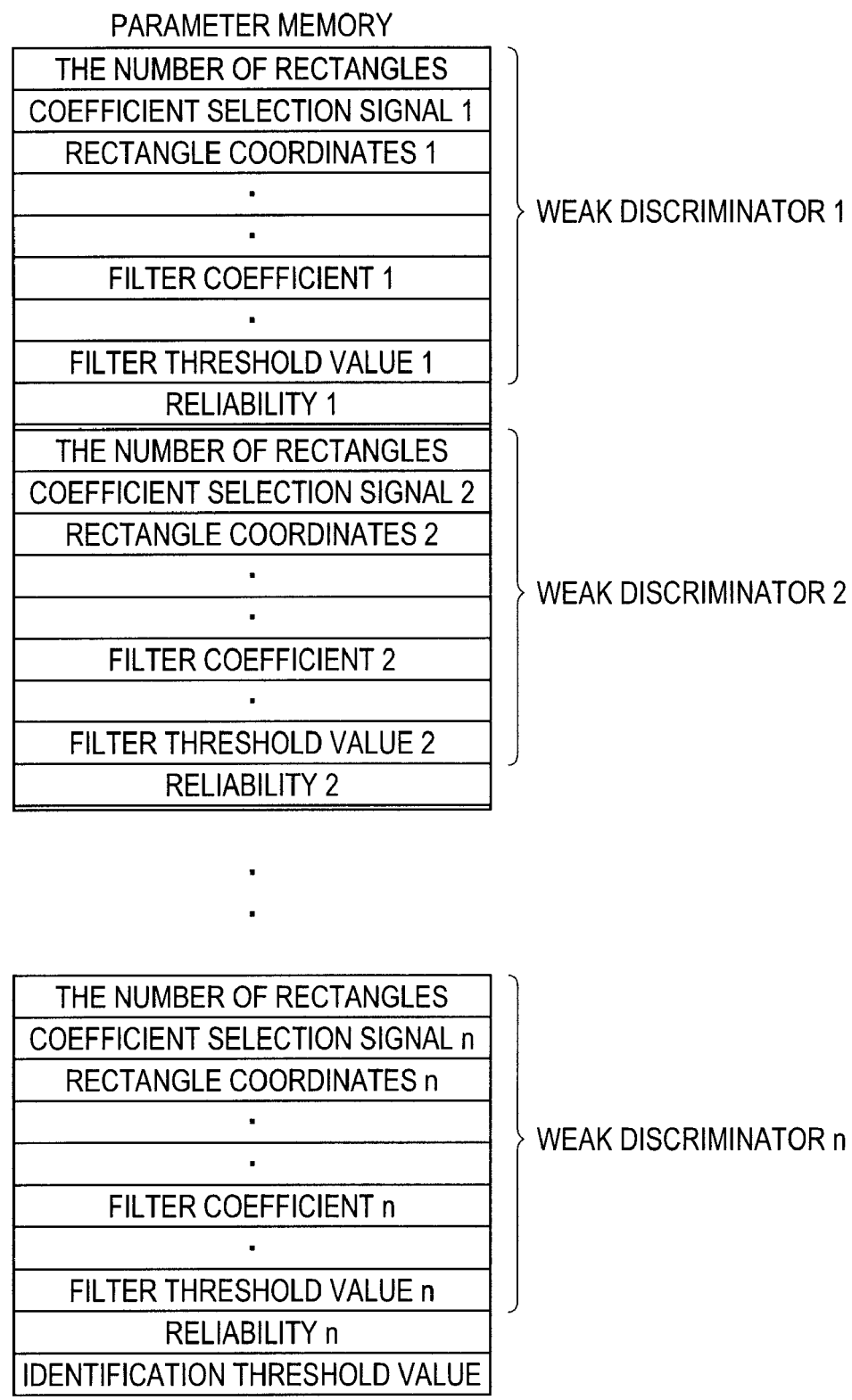
FIG. 7 is a diagram for describing an example of contents of a parameter memory.
Figure 8:
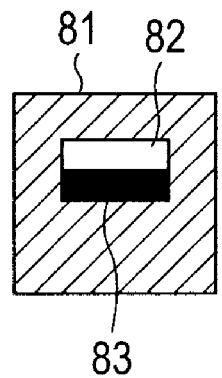
FIG. 8 is a diagram illustrating an example of the rectangle filter.

A parameter memory 910 is a memory for storing parameter information adapted to construct the weak discriminator. FIG. 7 is a diagram for describing an example of the contents of the parameter memory 910. The contents of the parameter memory are previously formed by learning. A case where the rectangle filter disclosed in the thesis of Viola et al. is applied as a weak discriminator will be described hereinbelow. In FIG. 7, "the number of rectangles" is information to designate the number of rectangles in a detection window. For example, in the case of a filter illustrated in FIG. 8, the number of rectangles is equal to 2. FIG. 8 is a diagram illustrating an example of the rectangle filter. The weak discriminator threshold-value processes a difference value between the sums of two rectangular areas 82 and 83 in a detection window 81. "Rectangle coordinates" are coordinates information necessary to calculate the sums of the image data in the rectangular areas 82 and 83. The weak discriminator can calculate the sums of the image data in the rectangular areas at an extremely high speed by referring to the SAT data. The SAT data calculated by the pre-processing unit 202 is stored in an SAT memory 950. Prior to starting the detecting process for the image data of one image, the information processing apparatus forms SAT data from the detection target image data and processes in a rectangle filter process with reference to the SAT data. Since the SAT is not related to the feature of the embodiment, its detailed description is omitted. The SAT has been disclosed in the thesis of Viola et al. or the like.

Figure 9:
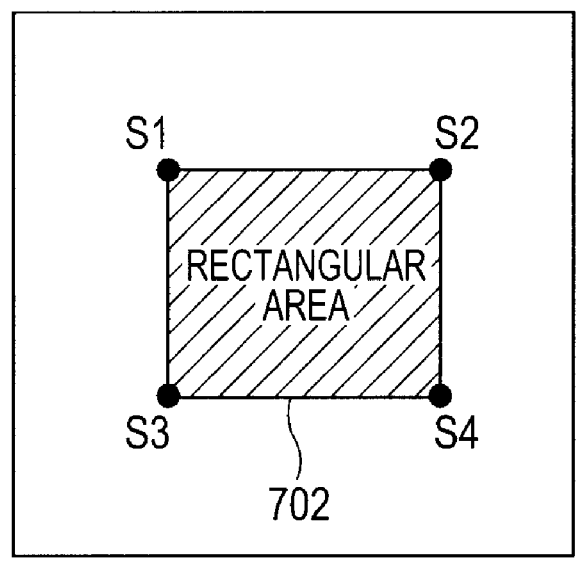
FIG. 9 is a diagram for describing an example in which a rectangular area is calculated from SAT data.

FIG. 9 is a diagram for describing an example in which a rectangular area is calculated from the SAT data. The weak discriminator can calculate the sum of the data in a rectangular area 702 in an input data area 701 by using SAT data values S1 to S4 of four coordinates in the SAT data area on the basis of S4+S1−(S2+S3). "Rectangle coordinates" in FIG. 7 are coordinate values for calculating the sum of the image data in the rectangular area by using the SAT. The number of "rectangle coordinates" increases or decreases according to "the number of rectangles". "Filter coefficient" is +1 or −1. "Filter threshold value" is a value adapted to threshold-value process an output value of the rectangle filter (rectangle filter output value) as an example of the discriminating filter. "Reliability" is a reliability for the target weak discriminator (contribution ratio of the weak discriminator to the strong discriminator). In the boosting discrimination, the discrimination is made by the sum with a sign of the reliabilities. "Identification threshold value" is a threshold value adapted to make a final discrimination of the boosting discriminator.

Assuming that a discrimination result of the weak discriminator is set to $h_j(x)$, the "reliability" is set to $\alpha_j$, and the "identification threshold value" is set to $T_{gh}$ (x: reference data, j: weak discriminator number), respectively, a final discrimination processing unit 960 makes a final discrimination according to the following expression (1). If it is determined that the object is a detection target object, $h_j(x)$ is set to 1 and output. If it is determined that the object is a non-detection target object, $h_j(x)$ is set to −1 and output.

$$\sum_{j=1}^{n} \alpha_j h_j(x) > T_{gh} \tag{1}$$

When the expression (1) is satisfied, the final discrimination processing unit 960 determines that the detection target object exists in the detection window.

When the weak discriminator is the rectangle filter illustrated in FIG. 8, assuming that the sum of the data in the area 82 is set to S1, the sum of the data in the area 83 is set to S2, and coefficients corresponding to the rectangular areas are set to filter coefficients 1 and 2, respectively, an arithmetic operation of the following expression (2) is executed.

$$S1 \times \text{filter coefficient } 1 + S2 \times \text{filter coefficient } 2 > \text{discrimination threshold value} \tag{2}$$

By setting the filter coefficient 1 to +1 and by setting the filter coefficient 2 to −1 here, a difference value of the two areas is calculated. When the expression (2) is satisfied, 1 is output. When it is not satisfied, −1 is output. A discrimination result corresponds to $h_j(x)$ in the expression (1).

The expression (2) relates to an example in the case where the number of rectangles is equal to 2. In the case of a general rectangle filter structure, the weak discriminator is constructed by a discriminating process shown by the following expression (3).

$$\sum_{i}^{p} S_i C_i > WTh_j \tag{3}$$

where, p: the number of rectangular areas, $S_i$: sum of the pixel values in the rectangular area, $C_i$: coefficient for the rectangular area, $WTh_j$: discrimination threshold value for the j-th weak discriminator.

The shape and number of rectangular areas, $C_i$, $WTh_j$, and the like are parameters which are determined at the time of learning.

Each of weak discriminators $92_1$ to $92_n$ illustrated in FIG. 6 executes the predetermined discriminating process shown by the expression (3) to the detection target data and discriminates whether or not the target area includes the detection target object. Each of the weak discriminators $92_1$ to $92_n$ reads out the necessary SAT data from the SAT memory 950 according to the information such as "rectangle coordinates", "filter coefficient", and the like stored in the parameter memory 910 and executes a filter arithmetic operation.

Multipliers $93_1$ to $93_n$ multiply outputs (±1) of the weak discriminators $92_1$ to $92_n$ by the reliability $\alpha_j$ stored in the parameter memory, respectively. Cumulative adders $94_1$ to $94_n$ accumulation add discriminator output values multiplied by the reliability (a value of the left side in the expression (1)), respectively. The final discrimination processing unit 960 threshold-value processes an accumulation addition result by the "identification threshold value". By the above processes, the boosting discriminating process shown in the expression (1) is executed. When the expression (1) is finally satisfied, the final discrimination processing unit 960 determines that the detection target object exists in the detection window.

A control unit 980 controls an address counter 970 with reference to the contents of the parameter memory and, further, controls a sequence of the whole discrimination processing unit 203.

Figure 10:
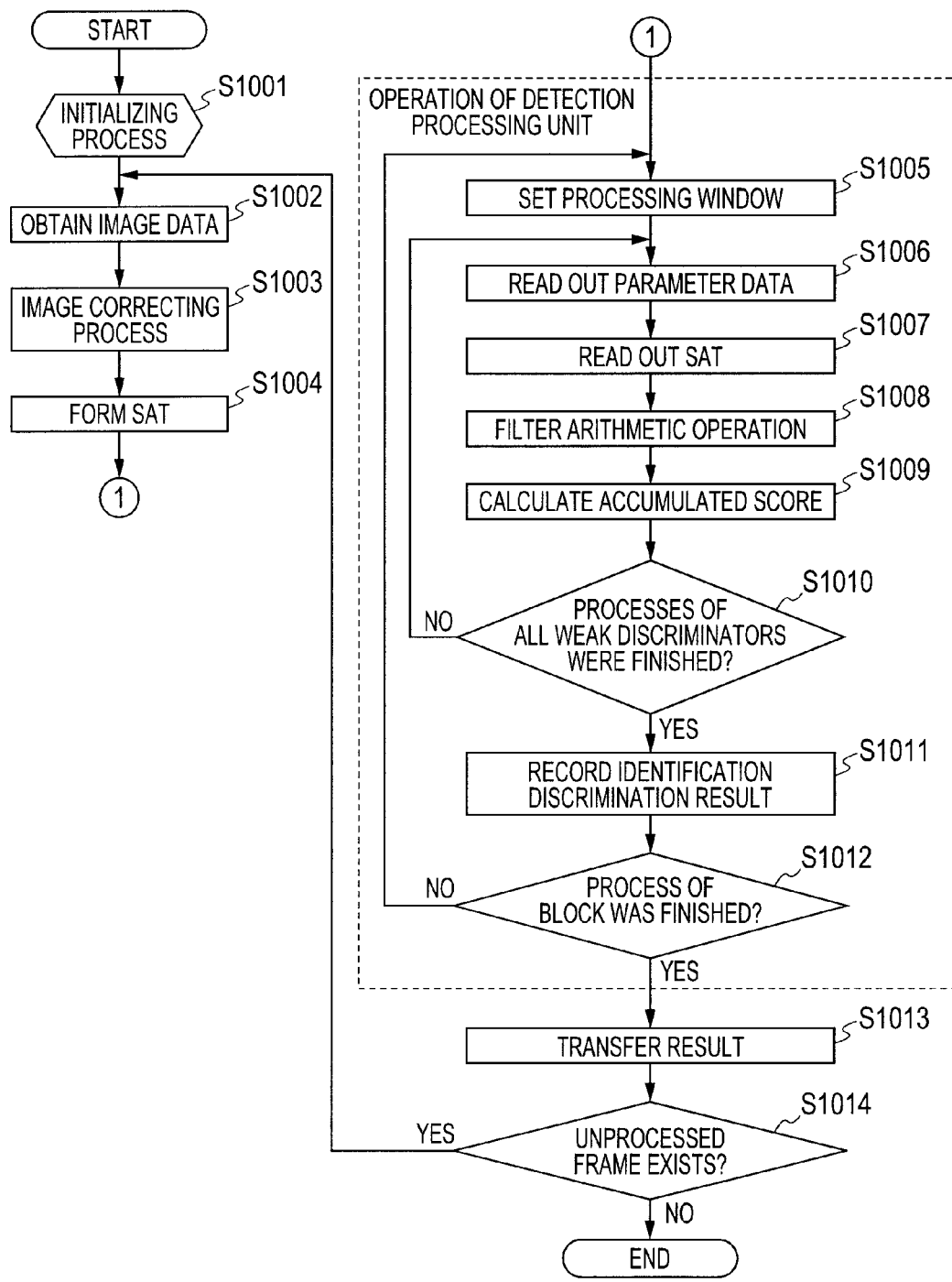
FIG. 10 is a flowchart for describing the operation at the time of a detecting process.

FIG. 10 is a flowchart for describing the operation at the time of the detecting process. In FIG. 10, the operation of the CPU 208 and the operation of the discrimination processing unit 203 are described in one flowchart.

First, prior to starting the detecting process, the CPU 208 executes various kinds of initializing processes in step S1001.

Each processing unit initializes internal register, memory, and the like according to an initializing instruction of the CPU 208.

When various kinds of settings for the detecting process are finished, the CPU 208 activates the image input unit 201 in step S1002 and activates the pre-processing unit 202 in step S1003. The image input unit 201 obtains the image data of one frame from an image pickup apparatus and stores into an internal buffer (not shown). After completion of the storage, an image obtainment end interruption is issued to the CPU 208. When the interruption is detected, the CPU 208 transfers the image data obtained by activating the DMAC 206 into an internal memory (not shown) of the pre-processing unit 202. When the transfer of the image data is finished, the pre-processing unit 202 starts the pre-process. In the pre-processing unit 202, a contrast of the image data is corrected according to a contrast correction parameter and the like which are preliminarily designated (step S1003). When the correcting process is finished, the pre-processing unit 202 starts the formation of the SAT data (step S1004). The formed SAT data is stored into the SAT memory 950 of the discrimination processing unit 203. When the transfer of the SAT data to the SAT memory 950 is finished, the actual discriminating process is started.

Subsequent steps S1005 to S1012 relate to a processing flow for describing the operation regarding the hardware process of the discrimination processing unit 203.

Figure 1:
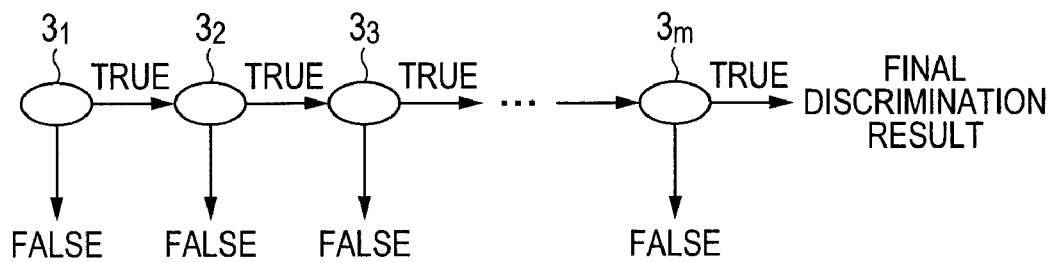
FIG. 1 is a diagram illustrating a constructional concept of the system disclosed in the thesis of Viola et al.
Figure 2:
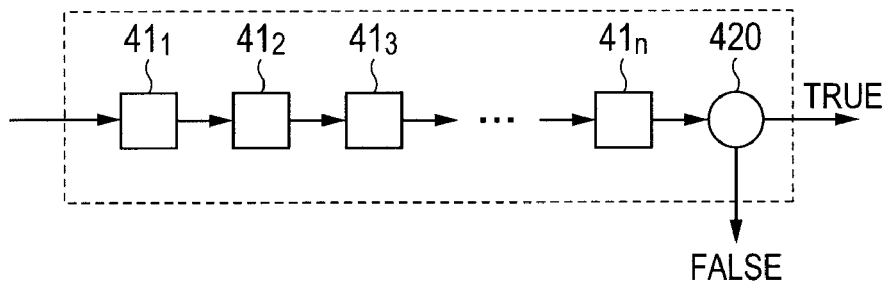
FIG. 2 is a diagram illustrating an internal construction of a boosting discriminator.
Figure 3:
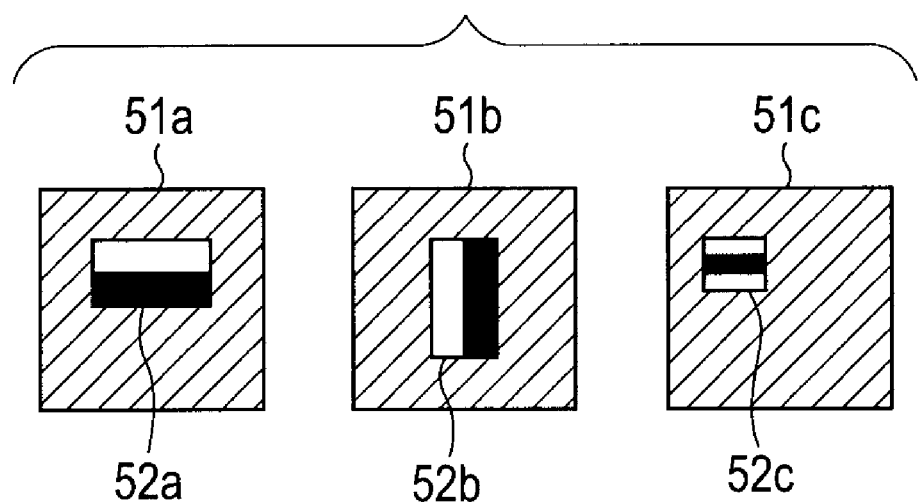
FIG. 3 is a diagram illustrating examples of rectangle filters.
Figure 4:
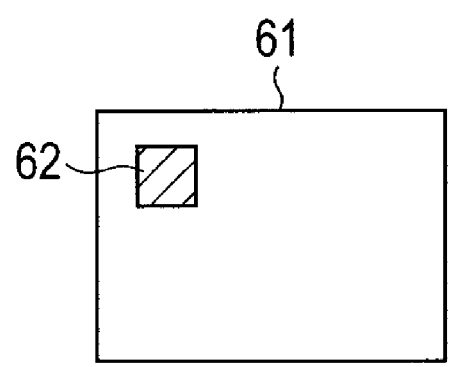
FIG. 4 is a diagram illustrating an example of image data as a detection target.

First, in step S1005, a processing block is decided. The processing block is the detection window 62 in FIG. 4. By detecting while scanning the window on a unit basis of one pixel or one line, the detection target object in the whole image is extracted.

When the processing block is decided, the weak discriminator arithmetic operating processes are sequentially started. First, data adapted to construct the first weak discriminator is read out with reference to the parameter memory 910 (step S1006). By controlling the address counter 970, the control unit 980 sequentially reads out the contents of the parameter memory 910 corresponding to the weak discriminator. After completion of the read-out of the parameter memory 910, the predetermined SAT data is read out according to the coordinates information read out in step S1007. Subsequently, in step S1008, a predetermined rectangle filter arithmetic operating process is executed. The contents of the arithmetic operation here are a product sum arithmetic operation corresponding to an arithmetic operation of a left side value in the expression (3). In step S1009, a result of the filter arithmetic operation processing step (S1008) and a threshold value are compared and an accumulated score is calculated based on a comparison result. More specifically describing, values obtained by multiplying the output values (if it is determined that the object is a target object, +1 is output and, if it is determined that the object is a non-target object, −1 is output) of the weak discriminators $92_1$ to $92_n$ as threshold value processing results based on the expression (3) by the reliabilities 1 to n are accumulated by the adders $94_1$ to $94_n$. That is, the accumulated score is an accumulated value of the weak discriminator reliabilities based on the discrimination results of the weak discriminators. The above processes are repeated the number of times as many as the number of all weak discriminators (step S1010). A process of step S1009 corresponds to a process for sequentially calculating the left side value in the expression (1).

In step S1011, the accumulated score value and the identification threshold value are compared. The identification threshold value has also been stored in the parameter memory 910. In step S1011, whether or not the detection target object exists in the processing target block is threshold-value discriminated based. A discrimination result is recorded into a memory (not shown). Step S1011 corresponds to the discriminating process of the expression (1).

By repeating the above processes (steps S1005 to S1012), the presence or absence of the detection target object and its position are discriminated.

When the processes of one frame are finished, the discrimination processing unit 203 validates an interruption signal of the CPU 208. In response to the interruption signal, the CPU 208 transfers a detection result of the discrimination processing unit 203 to the RAM 210 (step S1013). If an unprocessed frame exists, the processing routine is returned to step S1002 (step S1014). The above processes are repetitively executed to the image of the next frame.

As mentioned above, a desired boosting discriminating process is executed according to processing contents designation information of the weak discriminator stored in the parameter memory 910 and the object serving as a detection target is detected.

Subsequently, the learning process of the information processing apparatus will be described.

Figure 11:
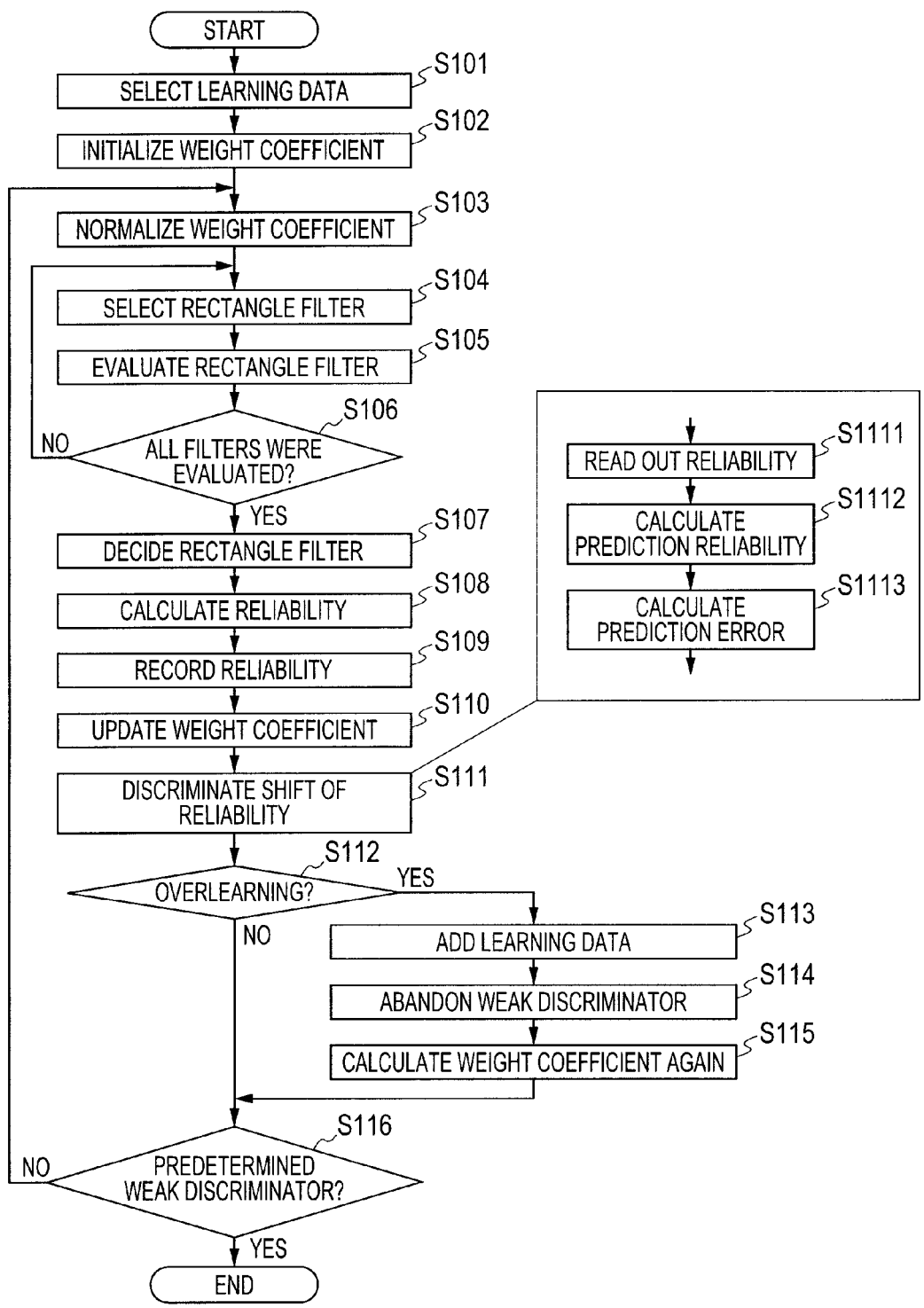
FIG. 11 is a flowchart for describing an example in the case of learning one boosting discriminator constructed by a plurality of weak discriminators.

FIG. 11 is a flowchart (part 1) for describing an example in the case of learning one boosting discriminator constructed by a plurality of weak discriminators. The following processes show the operation of the CPU 208.

It is assumed that prior to learning, a data group necessary for the learning has been stored in the storing unit 212. For example, in the case of detecting a specific object from the image, a plurality of image data including the detection target and a plurality of image data which does not include the detection target are prepared and labeled as detection target data and non-detection target data, respectively.

It is assumed that the weak discriminator is learned according to an Adaboost algorithm hereinbelow. A fundamental learning method is the same as the method disclosed in the thesis of Viola et al.

First, in step S101, the CPU 208 selects data which is used for the learning from the learning data held in the storing unit 212. A detection target image and a non-detection target image are selected at random at a predetermined ratio.

In step S102, the CPU 208 initializes weight coefficient to each learning data. The weight coefficient corresponds to a contribution ratio of the learning data to the learning process. When the total number of learning data is equal to m, the CPU 208 initializes all weight coefficients $w_{t,i}$ (t: number of the weak discriminator which is formed, i: number of the learning data) by the following equations (4).

$$w_{1,i} = 1/m, \; i = 1, \ldots, m \qquad (4)$$

It is now assumed that a common weight is applied to all of the learning data.

Subsequently, in step S103, the CPU 208 initializes the weight coefficients by the following expression (5).

$$w_{t,i} \leftarrow \frac{w_{t,i}}{\sum_{i=1}^{m} w_{t,i}} \qquad (5)$$

When the weight coefficients are changed by the subsequent process, the CPU 208 normalizes the weight coefficients by the process in this step so that the sum of them is equal to 1.

Subsequently, in steps S103 to S110, the CPU 208 learns one weak discriminator. First, in step S104, the CPU 208 selects one rectangle filter from the rectangle filter group. To a fundamental rectangle filter having a predetermined shape, the rectangle filter group is a plurality of rectangle filter candidates having a deformation according to a size of fundamental rectangle filter and the position in the detection window. For example, even in the case of adjacent area difference filters illustrated in FIG. 8, a plurality of deformations are considered according to the size of rectangular area and the position in the detection window. All combinations of the rectangle filter groups also including their modifications are prepared while using the predetermined fundamental rectangle filter as a reference. In the process of this step, the prepared rectangle filter candidates are sequentially selected.

Figure 12:
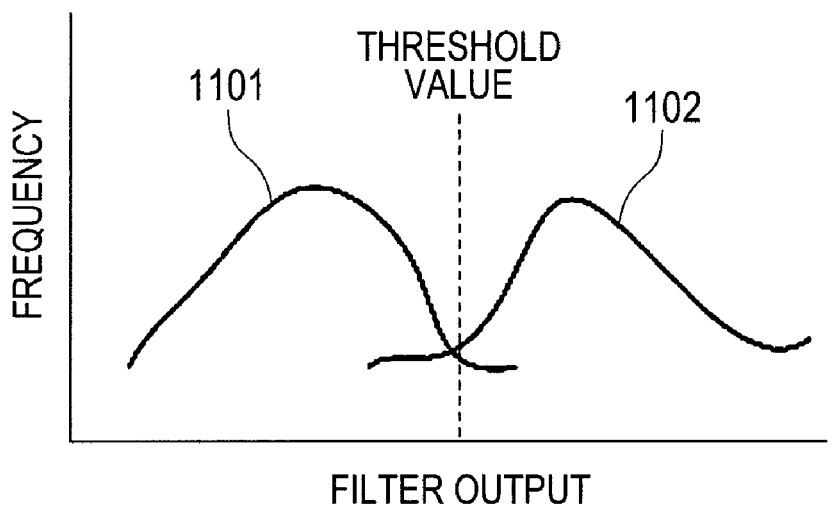
FIG. 12 is a diagram illustrating a filter output histogram of detection target data and a filter output histogram 1101 of non-detection target data.

Subsequently, in step S105, the CPU 208 evaluates discriminating performance of the rectangle filter for all of the learning data by using the selected rectangle filter. First, the CPU 208 calculates filter output values for all of the learning data and determines a threshold value adapted to separate the detection target and the non-detection target. The CPU 208 calculates the filter output values by hardware by using the discrimination processing unit 203. The CPU 208 decides the threshold value by using the histogram of the rectangle filter output values. FIG. 12 is a diagram illustrating a filter output histogram 1102 of the detection target data and a filter output histogram 1101 of non-detection target data. By using the histogram, the CPU 208 decides a threshold value Th adapted to precisely separate the detection target and the non-detection target. Further, in step S105, the CPU 208 calculates detection error rates to all of the learning data by using the decided threshold value Th. The following equation (6) indicates weighted error rates to all of the learning data.

$$E_j = \sum_{i=1}^{m} w_{t,i} \times |h_j(x_i) - y_i| \quad (6)$$

where, j: filter number, i: learning data number, t: weak discriminator number.

$h_j(x_i)$ denotes a discrimination output by the selected rectangle filter. When input target data $x_i$ is a detection target, the CPU 208 generates 1 by using the threshold value Th, and when it does not include the detection target, the CPU 208 generates 0. $y_i$ denotes a correct answer label and 1 or 0 is allocated thereto depending on whether the input image data is the detection target. In the rectangle filter evaluating step (S105), the CPU 208 calculates the weighted error rate in the equation (6). The CPU 208 executes the foregoing processes (steps S104 and S105) to all of the rectangle filter candidates.

When the calculation of all of the weighted error rates $E_j$ to the rectangle filter candidates is finished (step S106), the CPU 208 selects the rectangle filter of the smallest error rate $E_j$ (that is, the rectangle filter of the highest discriminating performance) as a weak discriminator (step S107).

Subsequently, the CPU 208 calculates the reliability for the weak discriminator from $E_j$ of the selected rectangle filter by the following equation (7) (step S108).

$$\alpha_t = \log\left(\frac{1-E_j}{E_j}\right) \quad (7)$$

where, t: the number of weak discriminators.

The CPU 208 records a calculated reliability $\alpha_t$ into the RAM 210 in step S109.

In step S110, the CPU 208 updates a weight coefficient for the learning data by the following arithmetic operating equation (8).

$$w_{t+1,i} = w_{t,i} \times \left(\frac{E_j}{1-E_j}\right) \quad (8)$$

where, t: the number of weak discriminators, i: learning data number.

A weight coefficient $W_{t,i}$ which is updated by the equation (8) is only the coefficient associated with the learning data i which could be correctly detected. That is, the CPU 208 updates the weight coefficient so that the weight of the learning data which was correctly detected decreases. That is, in step S110, the CPU 208 relatively increases the weight to the learning data which was erroneously detected.

The CPU 208 forms one weak discriminator by the processes so far (steps S103 to S110).

Figure 13:
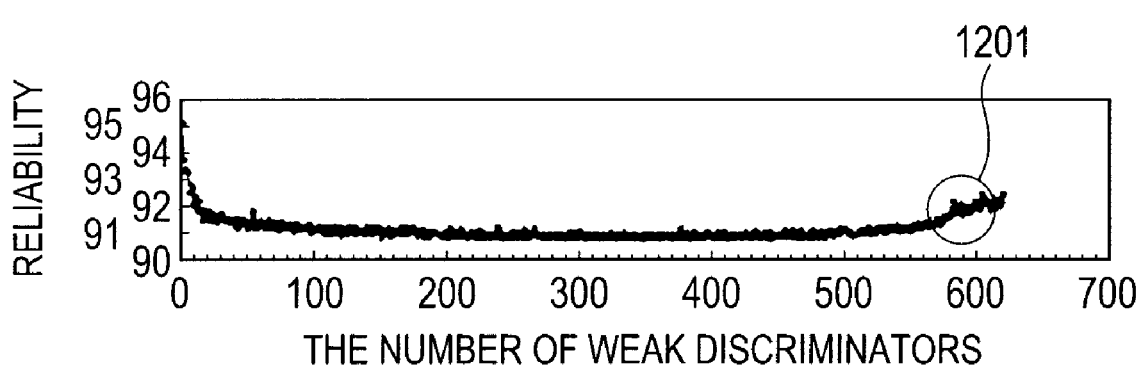
FIG. 13 is a diagram for describing an example of the number of weak discriminators and a shift of their reliabilities.

Subsequently, in step S111, the CPU 208 discriminates overlearning based on a shift of the reliability to each weak discriminator recorded in the RAM 210. FIG. 13 is a diagram for describing an example of the number of weak discriminators (the numbers of the weak discriminators which are sequentially formed) and the shift of their reliabilities. An axis of abscissa indicates the number of weak discriminators which are sequentially formed and an axis of ordinate indicates a value of the reliability (reliability value) corresponding to the weak discriminator. The "shift" mentioned here denotes a state in the case where the relation between the numbers of the weak discriminators which are sequentially formed and the reliability which is added to the weak discriminator corresponding to the weak discriminator number is seen as time sequential data.

In the case of FIG. 13, the reliability increases rapidly in the weak discriminator near a region 1201. In the boosting learning, by updating the weight coefficient for the learning data by the equation (8), the weak discriminators which detect the poor learning data are sequentially learned and formed. Therefore, the reliabilities excluding the reliability at the initial learning stage are set to an almost constant (or a gentle linear change) value. However, as for the boosting discriminator which is formed, the discriminating performance is improved together with an increase in the number of weak discriminators and, there is a case where when the number of learning data is insufficient, a weighted error rate $E_t$ is equal to an extremely small value. In such a case, a possibility that the overlearning for the data set has occurred is high. From the equation (7), the sudden change in error rate $E_t$ causes a change in reliability $\alpha_t$. In the embodiment, from such a viewpoint, the shift of the reliability is set to the learning condition of the overlearning. More specifically describing, the CPU 208 discriminates a difference amount between the reliability obtained in step S108 and a prediction value which is obtained from the reliabilities of the weak discriminators formed before then. When the difference amount is equal to or larger than a predetermined threshold value, it is determined that the overlearning has occurred.

Steps S1111 to S1113 are steps showing details of the reliability shift discriminating process (step S111). In step S1111, the CPU 208 reads out the reliabilities recorded in step S109 to the weak discriminators which have already been formed. In step S1112, the CPU 208 predicts the reliability of the weak discriminator based on the read-out reliabilities of a plurality of weak discriminators. An arithmetic operation equation (9) in the case of predicting the reliability by a simple movement average is shown below.

$$P_t = \sum_{k=1}^{a} \frac{\alpha_{t-k}}{a} \quad (9)$$

where, $P_t$: prediction value of the reliability, a: number adapted to obtain the movement average.

In step S1112, the CPU 208 calculates a prediction value $P_t$ by the arithmetic operation shown by the equation (9). In step S1113, the CPU 208 calculates a difference value between the prediction value $P_t$ obtained here and the calculated reliability $\alpha_t$ of the t-th weak discriminator. That is, the CPU 208 calculates a left side value of the following expression (10).

$$P_t - \alpha_t > \text{threshold value} \quad (10)$$

In step S112, the CPU 208 compares the difference value calculated in step S1113 with the threshold value, thereby discriminating whether or not the learning is the overlearning. That is, the CPU 208 discriminates the overlearning by the expression (10) in this step.

Figure 14:
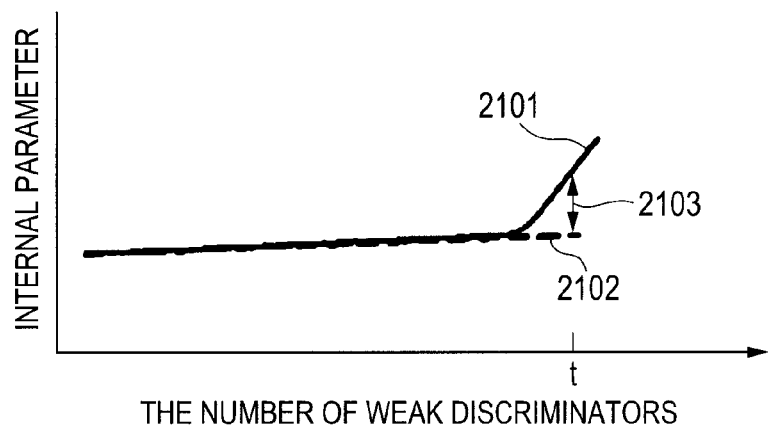
FIG. 14 is a diagram for schematically describing a state of overlearning discrimination.

FIG. 14 is a diagram for schematically describing a state of the overlearning discrimination. A shift 2101 of the reliability as an internal parameter is illustrated. A reliability prediction value $P_t$ 2102 when the t-th weak discriminator is formed is illustrated. The CPU 208 threshold-value processes a difference 2103 between the prediction value and the actual reliability, thereby detecting a change in shift (point of inflection) of the internal parameter.

Although the movement average value shown by the equation (9) is used here for simplicity of description, other various kinds of methods may be applied.

If it is determined in step S112 that the overlearning has occurred, in step S113, the CPU 208 adds data which is used for the learning. In this instance, the CPU 208 selects the data, at random, which is not used for the learning from the learning data stored in the storing unit 212 and registers the selected data as data which is used for the learning. In step S114, the CPU 208 abandons the weak discriminators of the number counted by tracing back from the weak discriminator which was finally formed among the formed weak discriminators (or deletes the weak discriminators which were logically formed). This is because a possibility that the latest strong discriminator formed at a point of time when the overlearning has been determined in step S112 constructs the strong discriminator which has already been in the overlearning state is high. That is, after the learning data was added, the CPU 208 abandons several weak discriminators which were finally formed, traces back the weak discriminators by the number of weak discriminators, and restarts the processes.

Figure 15:
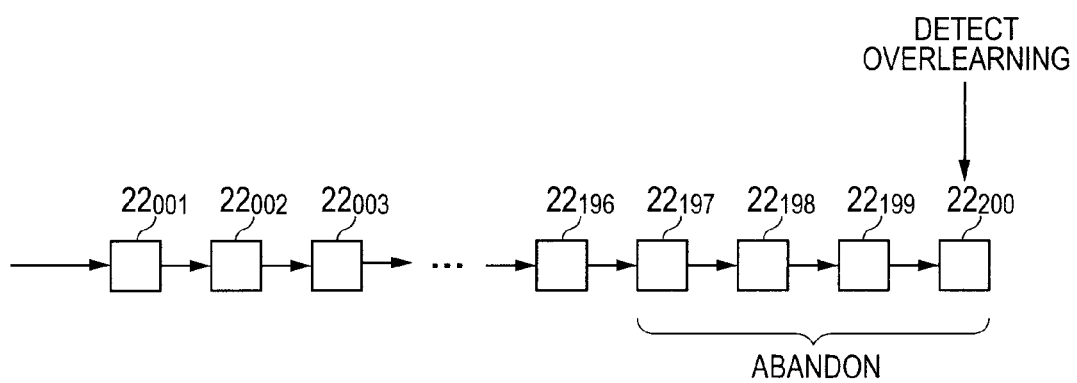
FIG. 15 is a diagram for describing an example of abandonment of weak discriminators.

FIG. 15 is a diagram for describing an example of the abandonment of the weak discriminators. It is assumed that the CPU 208 sequentially formed weak discriminators $22_{001}$ to $22_{200}$ by learning. In the case where the overlearning has been determined upon learning of the weak discriminator $22_{200}$, the CPU 208 abandons the weak discriminators $22_{197}$ to $22_{200}$ and restarts the processes from the learning of the weak discriminator $22_{197}$. In step S114, the CPU 208 subtracts a count value of a counter for managing the number of formed weak discriminators according to the number of weak discriminators which are abandoned.

Subsequently, the CPU 208 sequentially executes the detecting process to the weak discriminators left in step S114 by using the added learning data set and recalculates the weight coefficient for the learning of the weak discriminators which are newly formed (step S115). That is, the CPU 208 recalculates only the arithmetic operation of the equation (8) corresponding to each weak discriminator by using the new learning data set. After that, the CPU 208 continues the addition learning process of the new weak discriminators by using the weight coefficient recalculated in step S115.

In step S116, the CPU 208 discriminates whether or not the boosting discriminator which satisfies the conditions has been formed. If the conditions are not satisfied, the processing routine is returned to step S103 and the forming process (learning process) of the weak discriminators is continued. In step S116, the CPU 208 discriminates whether or not the processing routine is finished according to the conditions such as the number of formed weak discriminators and the like.

As mentioned above, according to the embodiment, the overlearning is discriminated based on the reliability which is calculated at the time of forming the weak discriminators and the learning data can be automatically added. Thus, the discriminator having the high generalizing performance can be made to automatically learn by adding the simple process.

Embodiment 2

Although the case where the reliability shown by the equation (7) is used as an evaluation value and the overlearning is discriminated based on the shift of the reliability has been described in the embodiment 1, in the embodiment 2, a case where an average accumulated score value of the boosting discriminator is used as an evaluation value and the overlearning is discriminated based on the shift of the average accumulated score value will be described.

Figure 16:
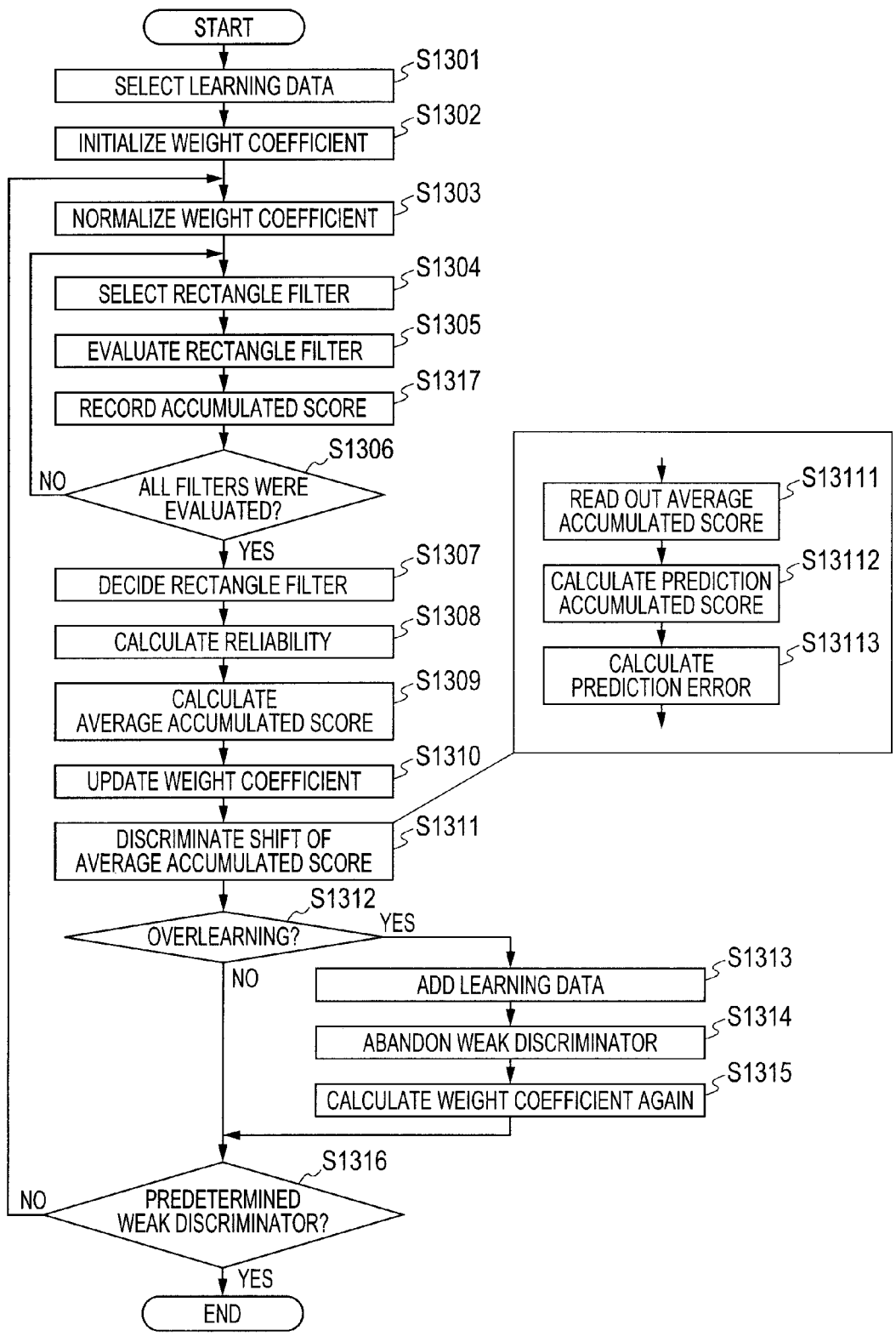
FIG. 16 is a flowchart for describing an example in the case of learning one boosting discriminator constructed by a plurality of weak discriminators.

In the embodiment, only a point different from the embodiment 1 will be described. FIG. 16 is a flowchart (part 2) for describing an example in the case of learning one boosting discriminator constructed by a plurality of weak discriminators. Since steps S1301 to S1308 are the same as steps S101 to S108 in the embodiment 1, their description is omitted here. In the embodiment, however, in step S1317, the CPU 208 calculates an accumulated score based on the filter discrimination result at the time of evaluating the rectangle filter (step S1305) in a manner similar to that upon detection and records the sum of the accumulated score value to each learning data. The accumulated score indicates the accumulated value of the outputs of the adders $94_1$ to $94_n$ and is an accumulation addition value of the values obtained by multiplying the discrimination results of the weak discriminators $92_1$ to $92_n$ by the reliabilities 1 to n as described in the embodiment 1. The average accumulated score is a value obtained by averaging the accumulated score which is calculated in step S1317 upon detection of each learning data by all learning data. A calculating equation (11) of the average accumulated score value $\overline{S_t}$ is shown below.

$$\overline{S_t} = \frac{\sum_{i=0}^{m} S_{t,i}}{m} \quad (11)$$

where, t: the number of filters, i: learning data number, m: the number of learning data.

In step S1309, the CPU 208 calculates the average accumulated score of the equation (11) by using the accumulated score sum value recorded in step S1317. In step S1310, the CPU 208 updates the weight coefficient in a manner similar to step S110 in the embodiment 1.

Figure 17:
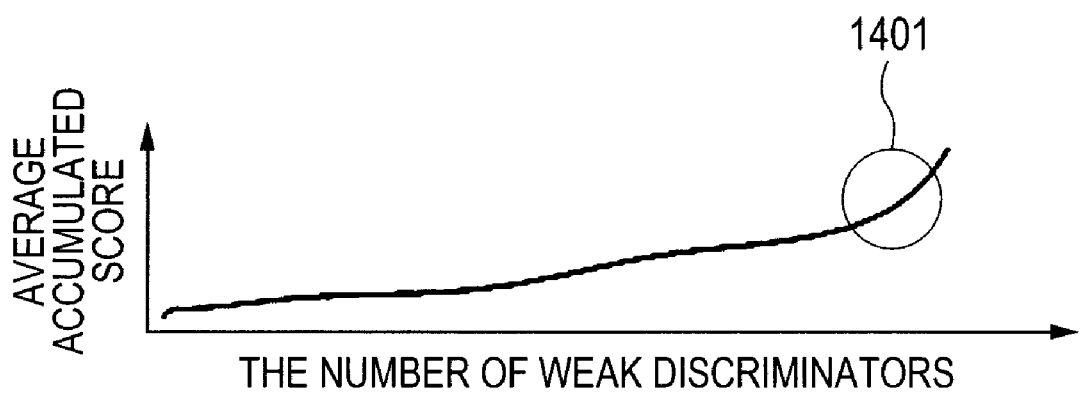
FIG. 17 is a diagram schematically illustrating a shift of an average accumulated score.

In step S1311, the CPU 208 discriminates the overlearning based on a shift of the average accumulated score. FIG. 17 is a diagram schematically illustrating the shift of the average accumulated score. An axis of abscissa indicates the numbers of the weak discriminators which are sequentially formed and an axis of ordinate indicates a value of the average accumulated score to the weak discriminator number. In this case, the average value of the accumulated score increases rapidly in the weak discriminator near a region 1401. Since the accumulated score is equal to the value obtained by accumulating the reliabilities, it relates to a phenomenon which occurs when the accumulated score also changes with a correlation in accordance with the increase in reliability value. Since the accumulated score is equal to the accumulation addition value of the reliabilities, the increase in reliability can be discriminated with a higher likelihood (since the change in shift of the reliability is emphasized).

Steps S13111 to S13113 relate to an operating flow for describing the details of the step of the average accumulated score shift discriminating process (S1311). In step S13111, the CPU 208 reads out the average accumulated score which was calculated in step S1309 and recorded. In step S13112, the CPU 208 predicts an accumulated score by using the past average accumulated score read out in step S13111. It is also predicted here by the simple movement average by the following equation (12) in a manner similar to the embodiment 1.

$$P_t = \sum_{k=1}^{a} \frac{S_{t-k}}{a} \quad (12)$$

where, $P_t$: prediction value of the average accumulated score, a: number adapted to obtain the movement average.

In step S13112, the CPU 208 calculates the prediction value $P_t$ by the arithmetic operation shown in the equation (12). In step S1113, the CPU 208 calculates a difference value between the obtained $P_t$ and $S_t$. That is, the CPU 208 calculates a left side value in the following expression (13).

$$P_t - S_t > \text{threshold value} \quad (13)$$

In step S1312, the CPU 208 compares the difference value calculated in step S13113 with a predetermined threshold value, thereby discriminating the overlearning. That is, the CPU 208 discriminates the overlearning by the expression (13).

Since subsequent steps S1313 to S1316 are similar to steps S113 to S116 in the embodiment 1, their description is omitted here.

As mentioned above, according to the embodiment, by discriminating the shift of the average value to the learning data of the accumulated score, the overlearning can be more properly discriminated.

Embodiment 3

Although the case where the reliability shown in the equation (7) is used as an evaluation value and the overlearning is discriminated by the shift of the reliability has been described in the embodiment 1, a case where a truncation threshold of the weak discriminator is used as an evaluation value and the overlearning is discriminated by the shift of the truncation threshold will be described in the embodiment 3.

Figure 18:
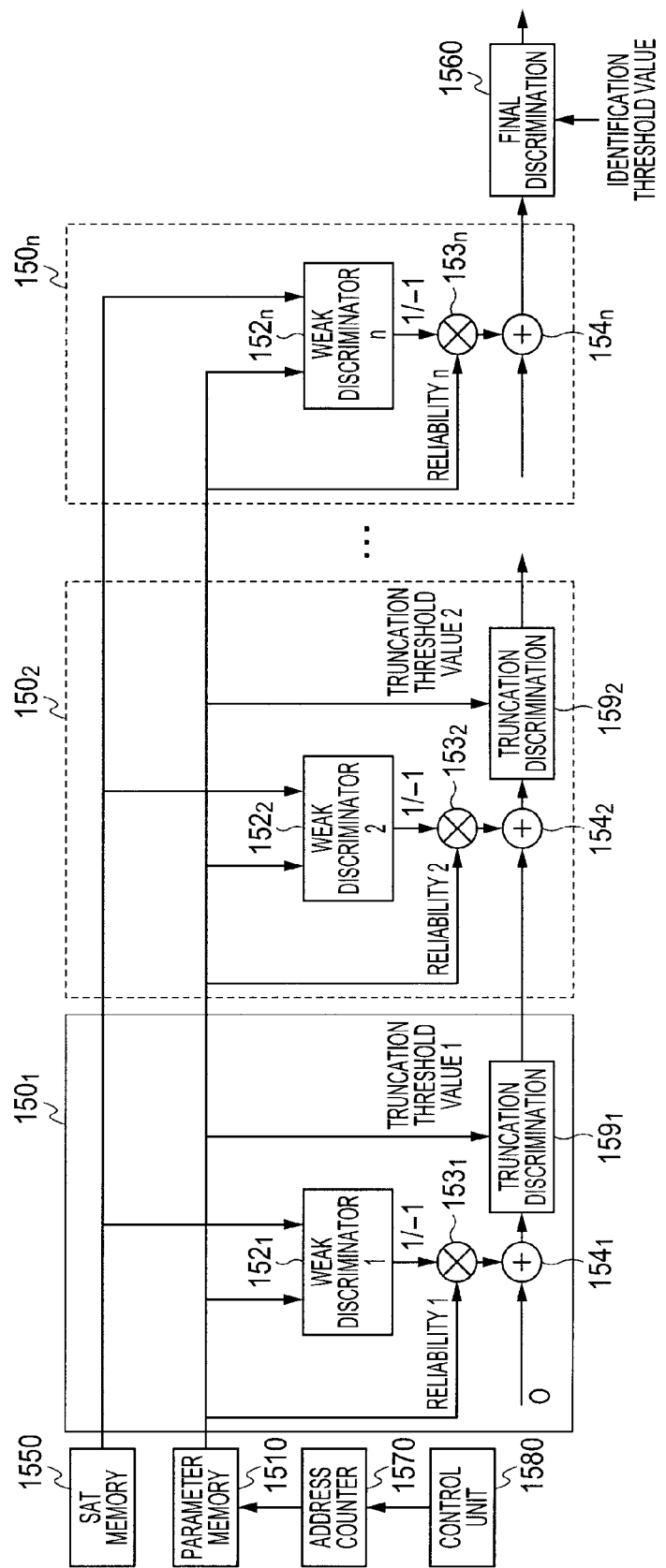
FIG. 18 is a diagram illustrating a construction of a discrimination processing unit in the third embodiment.
Figure 19:
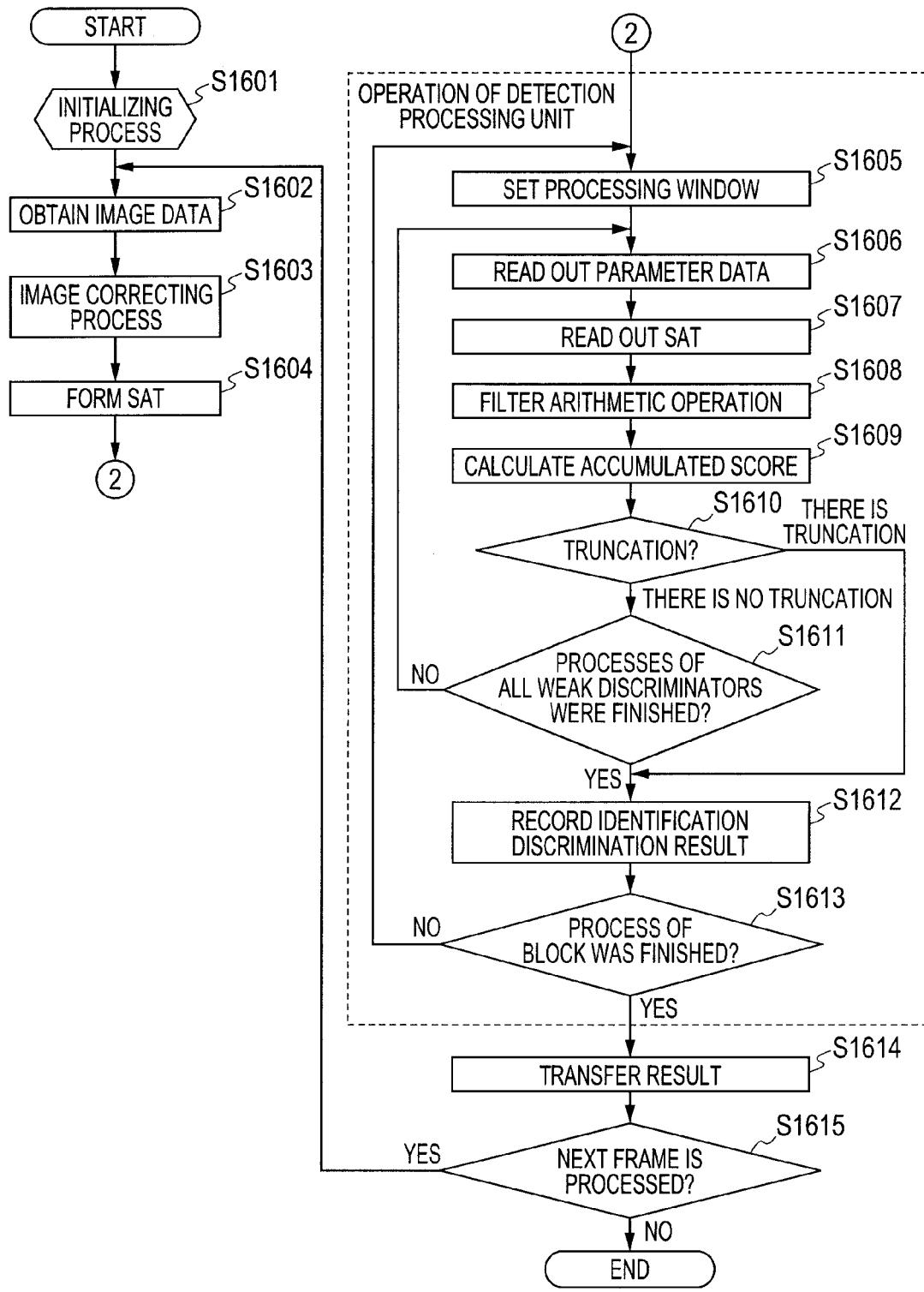
FIG. 19 is a flowchart for describing the operation at the time of the detecting process.

In the embodiment, only a point different from the embodiment 1 will be described. FIG. 18 is a diagram illustrating a construction of the discrimination processing unit 203 in the third embodiment. In the embodiment 1, the accumulated scores of all of the weak discriminators are threshold-value processed in the final discrimination processing unit 960, thereby discriminating the presence or absence of the detection target. According to the method disclosed in the thesis of Viola et al., as mentioned above, such boosting discriminators are cascade-connected and the truncation of the processes is discriminated on a boosting discriminator unit basis, thereby realizing the high speed. In the embodiment, as illustrated in FIG. 18, truncation discrimination processing units $159_1$ to $159_{n-1}$ for discriminating the presence or absence of the truncation for the accumulated score output of each weak discriminator are provided and the truncation of the processes is discriminated on a weak discriminator unit basis. In FIG. 18, since processing blocks other than the truncation discrimination processing units $159_1$ to $159_{n-1}$ are substantially the same as the corresponding blocks in FIG. 6, their description is omitted here. It is also assumed that as for weak discriminators $150_1$ to $150_n$ in the embodiment, one weak discriminator $150_1$ is physically time-divisionally used and arithmetic operations are executed in a manner similar to FIG. 6. FIG. 19 is a flowchart (part 2) for describing the operation at the time of the detecting process.

The detecting operation of the boosting discriminator regarding the embodiment will be described hereinbelow with reference to FIGS. 18 and 19. Steps S1601 to S1604 are the same as steps S1001 to S1004 in the embodiment 1.

Steps S1605 to S1612 relate to a processing flow for describing the operation regarding hardware processes of the discrimination processing unit 203.

First, in step S1605, a processing block is decided. The processing block is the detection window 62 illustrated in FIG. 4. By detecting while scanning the window on a unit basis of one pixel or one line, the detection target object in the whole image is extracted.

When the processing block is decided, the weak discriminator arithmetic operating processes are sequentially started. First, data adapted to construct the first weak discriminator is read out with reference to the parameter memory 910 (step S1606). By controlling the address counter 970, the control unit 980 sequentially reads out the contents of the parameter memory 910 corresponding to the weak discriminator. After completion of the read-out of the parameter memory 910, the predetermined SAT data is read out according to the coordinates information read out in step S1606 (step S1607). Subsequently, in step S1608, a predetermined rectangle filter arithmetic operating process is executed. The contents of the arithmetic operation here are a product sum arithmetic operation corresponding to the left side value arithmetic operation in the expression (3). In step S1609, a result of the filter arithmetic operation processing step (S1608) and a threshold value are compared and an accumulated score is calculated based on a comparison result. More specifically describing, values obtained by multiplying the output values (if it is determined that the object is a target object, +1 is output and, if it is determined that the object is a non-target object, −1 is output) of the weak discriminators $92_1$ to $92_n$ as threshold value processing results based on the expression (3) by the reliabilities 1 to n are accumulated by the adders $94_1$ to $94_n$.

Subsequently, in step S1610, the accumulated score value and the truncation threshold which is decided by learning are compared (truncation discrimination processing units $159_1$ to $159_{n-1}$). The truncation threshold here is a value which is decided upon learning and has been recorded in the parameter memory. The truncation threshold will be described in detail hereinafter. When the accumulated score value is equal to the truncation threshold or less, it is determined that the processing block is not the detection target object, and the processes of the next block are continued. If the accumulated score value exceeds the truncation threshold, the arithmetic operations of a predetermined number of weak discriminators are repeated (steps S1606 to S1611). If the truncation due to the weak discriminator does not occur, the accumulated score is compared with the identification threshold value in step S1612. Whether or not the detection target object exists in the processing target block is final threshold-value discriminated and a discrimination result is recorded into a memory (not shown). If the truncation due to the weak discriminator occurred, the final identification discrimination is not performed but information showing that the detection target object does not exist is recorded in step S1612.

By repeating the above processes while scanning the detection window, the presence or absence of the detection target object and its position are discriminated (steps S1605 to S1613).

When the processes of one frame are finished, the discrimination processing unit 203 validates the interruption signal of the CPU 208. In response to the interruption signal, the CPU 208 transfers the detection result of the discrimination processing unit 203 to the RAM 210 (step S1614). The above processes are sequentially repetitively executed to each frame.

As mentioned above, in the boosting discriminator of the embodiment, by performing the truncation of the detecting process on a weak discriminator unit basis, the detection can be performed at a high speed.

Figure 20:
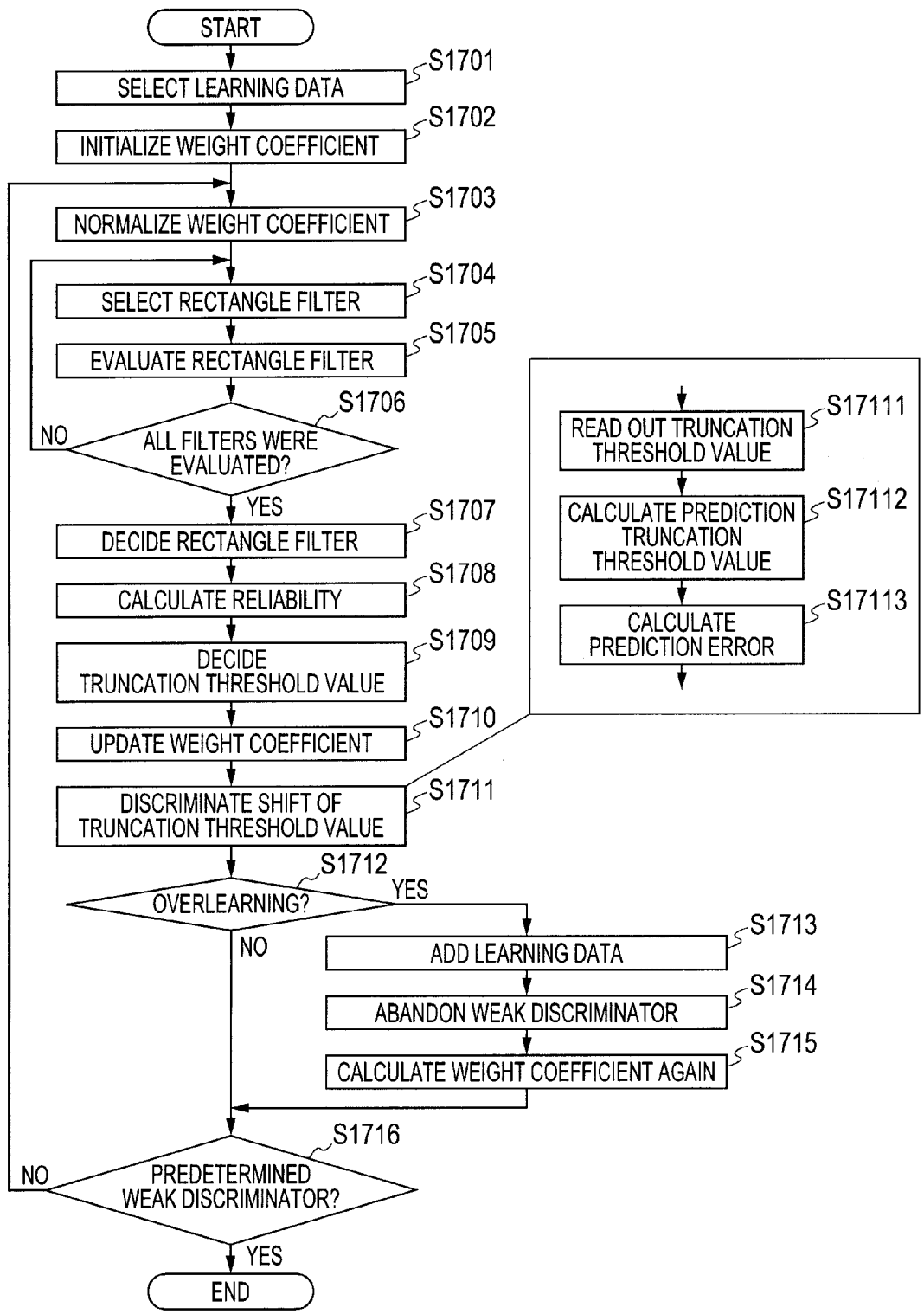
FIG. 20 is a flowchart for describing an example in the case of learning one boosting discriminator constructed by a plurality of weak discriminators.

Subsequently, the learning process of the boosting discriminator according to the embodiment will be described. FIG. 20 is a flowchart (part 3) for describing an example in the case of learning one boosting discriminator constructed by a plurality of weak discriminators. Only a point different from the embodiment 1 will be also described. Steps S1701 to S1708 are the same as steps S101 to S108 in the embodiment 1.

In step S1709, the CPU 208 determines a threshold value adapted to discriminate the truncation every weak discriminator. In a manner similar to the method of deciding the discrimination threshold value of the rectangle filter, the CPU 208 determines the threshold value from a histogram of the accumulated score to the detection target data and a histogram of the accumulated score to the non-detection target data.

Figure 21:
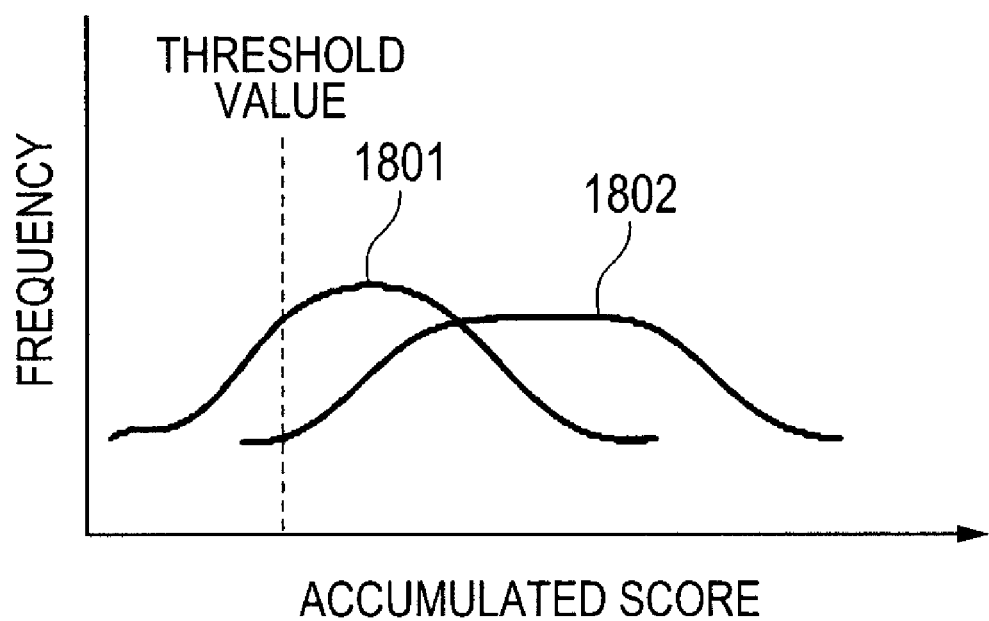
FIG. 21 is a diagram for schematically describing examples of accumulated histograms for describing a deciding method of a threshold value.

FIG. 21 is a diagram for schematically describing examples of accumulated histograms for describing the deciding method of the threshold value. A histogram 1801 of the accumulated score to the non-detection target data is illustrated. A histogram 1802 of the accumulated score to the detection target data is illustrated. The CPU 208 determines the truncation threshold in such a manner that an erroneous truncation ratio of the detection target data (the number of truncation times of the detection target data which is erroneously truncated/the number of detection target data) is equal to a predetermined value or less. The CPU 208 can easily decide the threshold value by using an integration value or the like of the histogram. In steps S1709, the CPU 208 records the decided truncation threshold in correspondence to the weak discriminator number.

Figure 22:
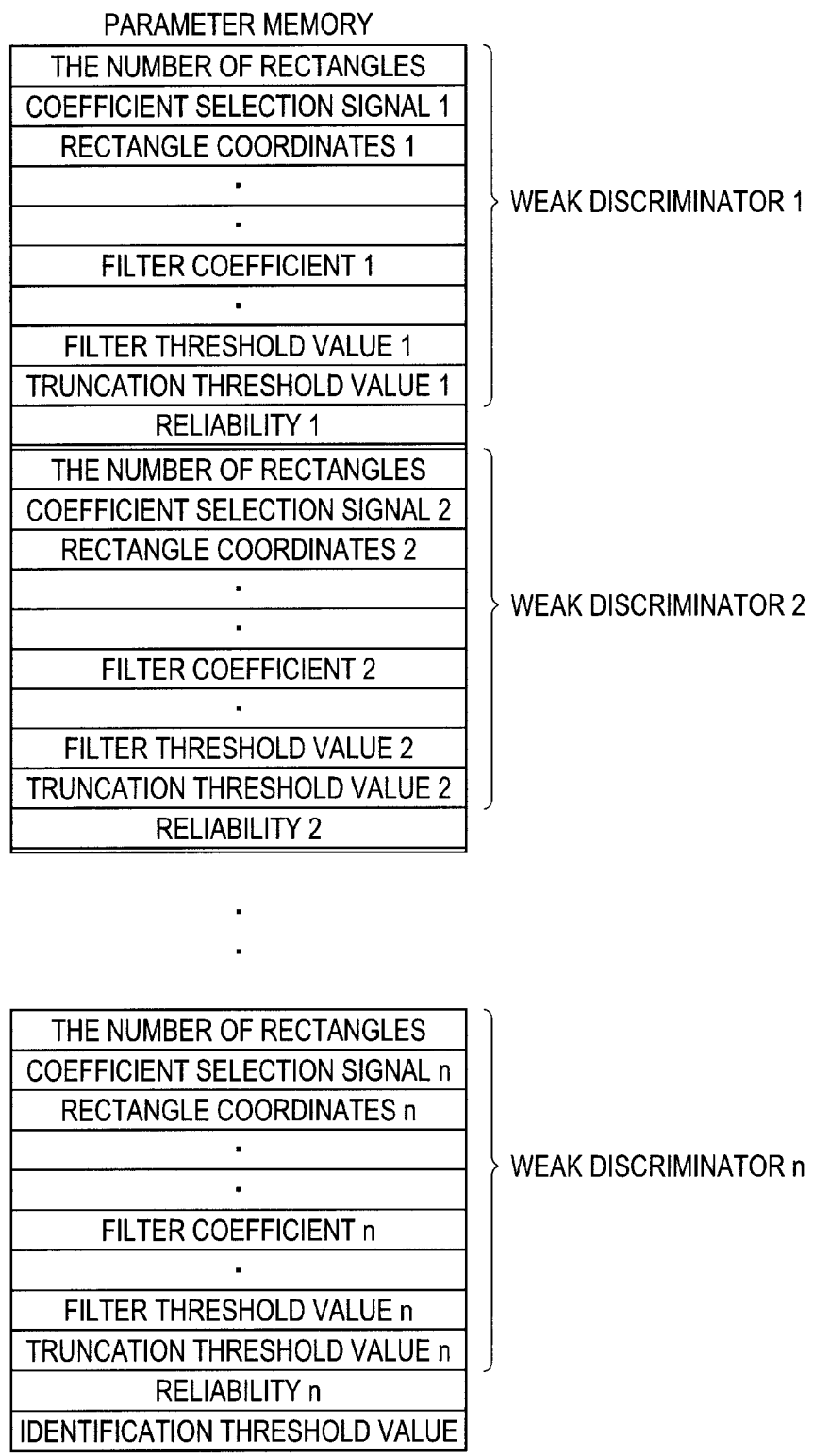
FIG. 22 is a diagram for describing an example of contents of the parameter memory.

FIG. 22 is a diagram (part 2) for describing an example of the contents of the parameter memory 910. As compared with the parameter memory (FIG. 7) in the embodiment 1, "truncation thresholds 1 to n" have been added to the parameter memory in FIG. 22 every weak discriminators 1 to n. As mentioned above, at the time of the detection, the CPU 208 discriminates the truncation of the processes by using the truncation threshold in the parameter memory.

Step S1710 is the same as step S110.

In step S1711, the CPU 208 discriminates the overlearning from the shift of the truncation threshold.

Figure 23:
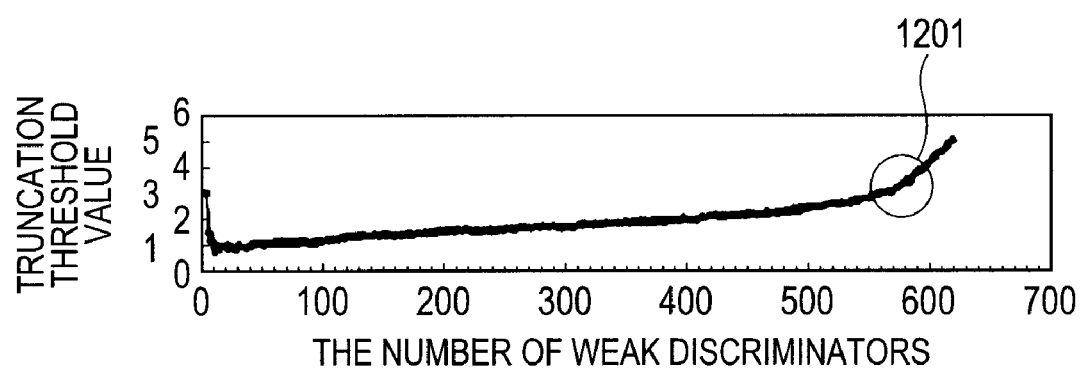
FIG. 23 is a diagram for describing an example of the number of weak discriminators and a shift of a corresponding truncation threshold.

FIG. 23 is a diagram for describing an example of the number of weak discriminators and the shift of the corresponding truncation threshold. An axis of abscissa indicates the numbers of the weak discriminators which are sequentially formed and an axis of ordinate indicates the truncation thresholds corresponding to the weak discriminators. In the case of FIG. 23, the truncation threshold increases rapidly in the weak discriminator near a region 1201. Since the truncation threshold eventually becomes a value related to the average accumulated score described in the embodiment 2 (when a truncation ratio of the detection target object is set to be constant, the truncation threshold also increases together with an increase in average accumulated score), it changes in a manner similar to the sudden change in average accumulated score associated with the sudden change in reliability. In the embodiment, such a shift of the truncation threshold is set to the discriminating condition of the overlearning. More specifically describing, the CPU 208 discriminates a deviation between the truncation threshold decided in step S1709 and the prediction value obtained from the truncation thresholds of the weak discriminators formed before then. If the deviation is equal to a predetermined threshold value or more, it is decided that the overlearning has occurred.

Steps S17111 to S17113 are processing steps showing the contents of step S1711 of the truncation threshold shift discriminating process. In step S17111, the CPU 208 reads out the truncation thresholds recorded in step S1709 to the weak discriminators which have already been formed. In step S17112, the CPU 208 predicts truncation thresholds of the formed weak discriminators from the read-out truncation thresholds $Th_t$ of the plurality of weak discriminators. An equation (14) shows an arithmetic operation in the case of predicting the truncation thresholds by the simple movement average.

$$P_t = \sum_{k=1}^{a} \frac{Th_{t-k}}{a} \quad (14)$$

where, $P_t$: prediction value of the truncation threshold, a: number adapted to obtain the movement average.

In step S17112, the CPU 208 calculates the prediction value $P_t$ by the arithmetic operation shown by the equation (14). In step S17113, the CPU 208 calculates a difference value between the prediction value $P_t$ obtained here and $Th_t$. That is, the CPU 208 calculates a left side value of the following expression (15).

$$P_t - Th_t > \text{threshold value} \quad (15)$$

In step S1712, the CPU 208 compares the difference value calculated in step S17113 and the threshold value, thereby discriminating the overlearning. That is, the CPU 208 discriminates the overlearning by the expression (15).

Subsequent steps S1713 to S1716 are the same as steps S113 to S116 in the embodiment 1.

As mentioned above, according to the embodiment, the overlearning can be discriminated by using the truncation threshold which is decided every weak discriminator. In this case, the discrimination of similar performance can be realized by adding the processing functions of the number smaller than that in the system of discriminating based on the average accumulated score.

Embodiment 4

Although the case where the reliability shown in the equation (7) is used as an evaluation value and the overlearning is discriminated by the shift of the reliability has been described in the embodiment 1, a case where a discrimination using inspection data is also further combined to the discrimination about the overlearning will be described in the embodiment 4.

Figure 24:
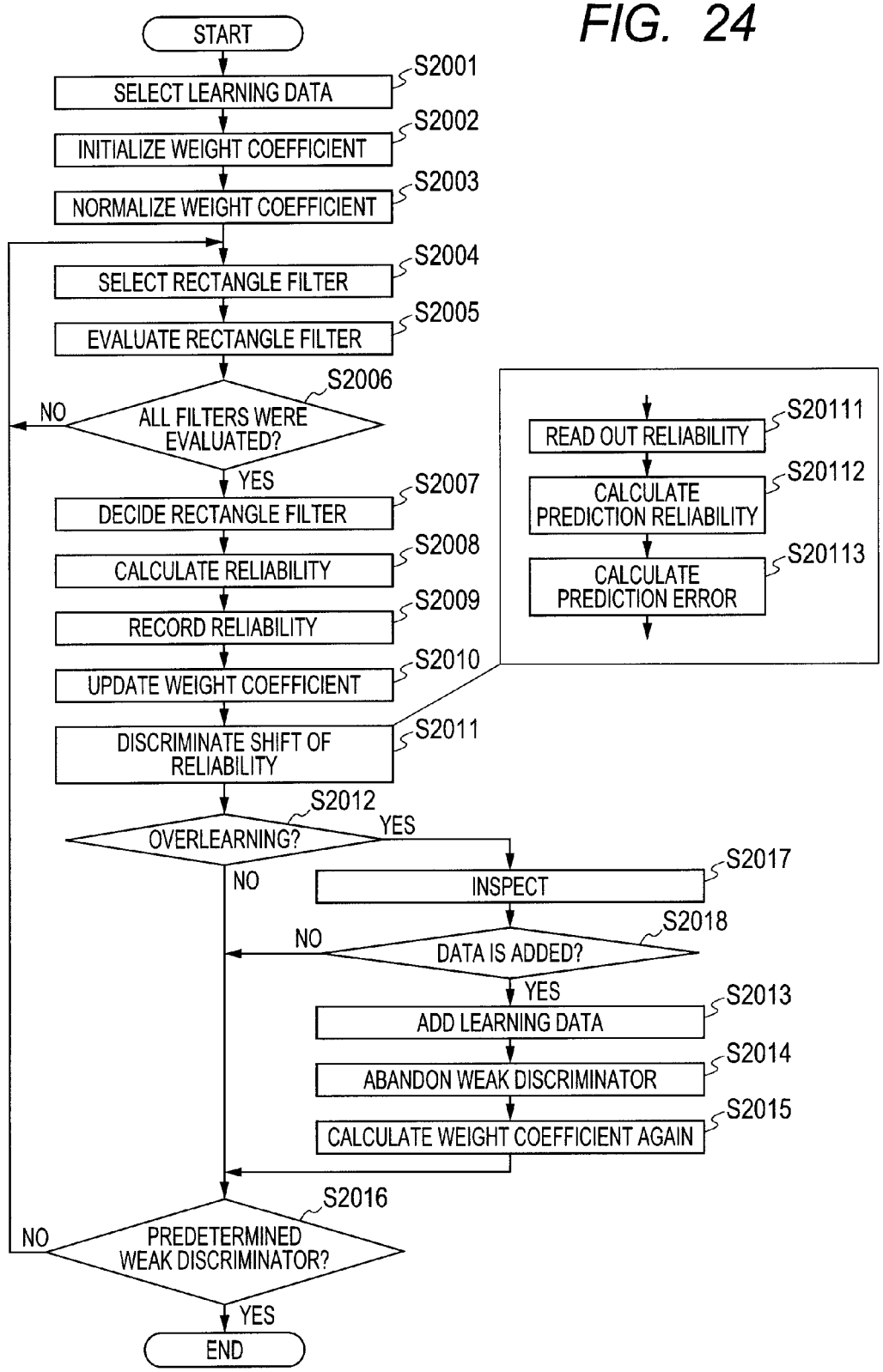
FIG. 24 is a flowchart for describing an example in the case of learning one boosting discriminator constructed by a plurality of weak discriminators.

In the embodiment, only a point different from the embodiment 1 will be described. FIG. 24 is a flowchart (part 4) for describing an example in the case of learning one boosting discriminator constructed by a plurality of weak discriminators. Since steps S2001 to S2012 and steps S20111 to S20113 are the same as processing steps S101 to S112 and steps S1111 to S1113 in the embodiment 1, their description is omitted here.

If it is decided in step S2012 that the learning is the overlearning, the CPU 208 executes a performance inspecting process in step S2017. In this step, the CPU 208 inspects the detecting performance by using the image data which has been held in the storing unit 212 and which is not used for the learning. More specifically describing, the CPU 208 discriminates the performance of the weak discriminator from a detection ratio of the detection target object using the data for inspection, an erroneous detection ratio of the non-detection target object, and the like. In step S2018, the CPU 208 discriminates the presence or absence of the addition learning data by using the detecting performance (inspection result) evaluated in step S2017 as a reference. Various kinds of methods can be applied to the discrimination here. For example, the CPU 208 makes the discrimination from the erroneous detection ratio or the like in the case where the identification threshold value is adjusted and the detection ratio is set to be constant. More specifically describing, the CPU 208 compares the detecting performance calculated by using all of the weak discriminator groups up to the weak discriminators formed just before and the detecting performance calculated by using the weak discriminator group excluding the several weak discriminators including the weak discriminators formed just before, thereby discriminating. That is, in the case where the performance is not improved or deteriorates in spite of a fact that the weak discriminators were added, the CPU 208 determines that the data is added. If it is decided that the data is added, the CPU 208 adds the learning data in steps S2013 to S2015. Since steps S2013 to S2016 are the same as steps S113 to S116 in the embodiment 1, their description is omitted here.

As mentioned above, according to the embodiment, the overlearning is discriminated by using the reliability as an internal parameter which is obtained upon learning and only in the case where the possibility of the overlearning is predicted, the inspecting process is executed. Therefore, the learning time can be shortened as compared with that in the case where the inspecting process is executed each time at predetermined timing.

OTHER EMBODIMENTS

Although the case of processing the image data has been described in the foregoing embodiments, the invention is not limited to it. The invention can be also applied to a case of extracting a specific pattern from 1-dimensional data such as audio data or the like.

Although the case where the reliability $\alpha_t$ shown in the equation (7) is used as an evaluation value and the overlearning is discriminated by the shift of the reliability has been described in the above embodiments, since $\alpha_t$ is a function of $E_t$, the overlearning may be discriminated by using the error rate $E_t$ in place of $\alpha_t$.

Although the identifier by the boosting algorithm has been described as an example in the above embodiments, the invention may be applied to another ensemble learning algorithm using a parameter similar to the reliability in the boosting discriminator.

Although the above embodiments have been described with respect to the case where the invention is applied to the system using the rectangle filter as a weak discriminator, the invention is not limited to it but can be applied to detectors using other various weak discriminators.

Although the overlearning has been discriminated by using the movement average of the internal parameter value to the number of weak discriminators in the above embodiments, the invention is not limited to it but various kinds of calculating methods of the inflection point which has been proposed in the related arts can be applied. For example, a method of using a differential process or other various kinds of predicting methods can be also used. A high-order predicting method or a nonlinear predicting method may be applied. Further, a method whereby the discriminator for detecting the overlearning pattern from the shift of the internal parameter is formed by learning or the like may be applied. For example, a method whereby a plurality of internal parameter values are used as input vectors and the discriminator is formed by learning by an SVM (Support Vector Machine) or the like can be also applied. In this case, the specific pattern in which the overlearning has occurred is used as learning data and the discriminator is preliminarily learned.

Although the overlearning has been discriminated based on the shift of the reliability, accumulated score, truncation threshold, or the like in the above embodiments, instead of the discrimination using such time sequential data, it may be discriminated by its absolute value. In this case, although the discriminating precision deteriorates, the discrimination about the overlearning can be made by a simpler construction.

The above embodiments have been described with respect to the case of learning by using all learning data in the selected learning data set. However, as disclosed in Japanese Patent Application Laid-Open No. 2005-284348, the learning may be performed by sampling the learning data according to the weight coefficients allocated to the learning data, respectively.

Although the above embodiments have been described with respect to the case where the discrimination processing unit 203 is realized by the hardware, the whole discrimination processing unit 203 may be realized by software.

The functions described in the above embodiments can be also applied as an apparatus only for learning or software of a general-use computer.

Although the above embodiments have been described with respect to the case where all of the learning data is stored in the recording unit of the information processing apparatus and selectively used, for example, addition data may be obtained through the communicating unit 213 connected to the network or may be transferred from another apparatus. In the case of analyzing the performance by using the inspection data as described in the embodiment 4, the inspection data may be added from another apparatus to the information processing apparatus through the communicating unit 213.

According to each of the foregoing embodiments, the overlearning is easily detected and the learning can be efficiently executed.

The foregoing embodiments may be arbitrarily combined and executed.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-105486, filed on Apr. 23, 2009, which is hereby incorporated by reference herein in its entirety.

What is claimed is:

1. An information processing apparatus comprising a processor configured to:
   sequentially execute learning with respect to weak discriminators based on learning data held in a storage device;
   calculate an evaluation value for a weak discriminator at the time of the learning;
   discriminate whether or not the learning is overlearning based on a transition of evaluation values in the sequential execution of the learning;
   add new learning data to the storage device if it is determined that the learning is overlearning; and
   after the new learning data has been added to the storage device, control the sequential execution of the learning based on the learning data including the new learning data.

2. An apparatus according to claim 1, wherein the evaluation value is reliability.

3. An apparatus according to claim 1, wherein the evaluation value is a weighted error rate.

4. An apparatus according to claim 1, wherein the evaluation value is an average accumulated score as an average of accumulated scores regarding discrimination results of discriminating filters constructing the weak discriminators.

5. An apparatus according to claim 1, wherein the evaluation value is a truncation threshold of the weak discriminator.

6. An apparatus according to claim 1, wherein, if it is determined that the learning is overlearning, the processor is further configured to inspect performance of the weak discriminator by using data for inspection, discriminate whether or not the learning data should be added based on an inspection result, and, if it is determined that the learning data should be added, the processor is further configured to add the new learning data to the storage device.

7. An apparatus according to claim 1, wherein the processor is further configured to, if it is determined that the learning is overlearning, abandon a predetermined number of weak discriminators including the weak discriminators in which it is determined that the learning is overlearning and allow the sequential execution of the learning based on the learning data including the new learning data while tracing back to the abandoned weak discriminators.

8. An information processing method in an information processing apparatus, comprising:
   sequentially executing learning with respect to weak discriminators based on learning data held in a storage device;
   calculating an evaluation value for a weak discriminator at the time of the learning;
   discriminating whether or not the learning is overlearning based on a transition of evaluation values in the sequentially-executed learning;
   adding new learning data to the storage device if it is determined that the learning is overlearning; and
   after the new learning data has been added to the storage device, sequentially executing the learning based on the learning data including the new learning data.

9. A non-transitory computer-readable storage medium storing a program that allows a computer to execute an information processing method comprising:
   sequentially executing learning with respect to weak discriminators based on learning data held in a storage device;
   calculating an evaluation value for a weak discriminator at the time of the learning;
   discriminating whether or not the learning is overlearning based on a transition of the evaluation values in the sequentially executed learning;
   adding new learning data to the storage device if it is determined that the learning is overlearning; and
   after the new learning data has been added to the storage device, sequentially executing the learning based on the learning data including the new learning data.

* * * * *